United States Patent
Shobayashi

(10) Patent No.: US 11,867,966 B2
(45) Date of Patent: Jan. 9, 2024

(54) LENS SYSTEM, IMAGING DEVICE, AND IMAGING SYSTEM

(71) Applicant: Panasonic Intellectual Property Management Co., Ltd., Osaka (JP)

(72) Inventor: Hiroyuki Shobayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 566 days.

(21) Appl. No.: 17/146,803

(22) Filed: Jan. 12, 2021

(65) Prior Publication Data
US 2021/0132321 A1   May 6, 2021

Related U.S. Application Data

(63) Continuation of application No. PCT/JP2019/025219, filed on Jun. 25, 2019.

(30) Foreign Application Priority Data

Jul. 18, 2018 (JP) .................................. 2018-135300

(51) Int. Cl.
*G02B 13/12* (2006.01)
*G02B 7/02* (2021.01)
(Continued)

(52) U.S. Cl.
CPC .............. *G02B 7/021* (2013.01); *G02B 13/12* (2013.01); *H04N 23/58* (2023.01)

(58) Field of Classification Search
None
See application file for complete search history.

(56) References Cited

U.S. PATENT DOCUMENTS

2001/0046090 A1* 11/2001 Sato ................... G02B 15/1425
 359/691
2004/0169726 A1 9/2004 Moustier et al.
(Continued)

FOREIGN PATENT DOCUMENTS

JP 2010-85849 4/2010
JP 2016148725 A * 8/2016 ............. G02B 13/08
(Continued)

OTHER PUBLICATIONS

International Search Report dated Jul. 30, 2019 in International (PCT) Application No. PCT/JP2019/025219.
(Continued)

*Primary Examiner* — Pinping Sun
*Assistant Examiner* — Mackenzi Waddell
(74) *Attorney, Agent, or Firm* — Wenderoth, Lind & Ponack, L.L.P.

(57) ABSTRACT

A lens system for forming an image of light incident from an object side on an imaging element arranged on an image surface side includes: a plurality of lens elements including free-curved surface lenses; and a diaphragm arranged between the plurality of lens elements. The lens elements form a front group arranged on the object side of the diaphragm, and a rear group arranged on the image surface side of the diaphragm. A first lens element closest to the object side in the plurality of lens elements has an aspherical surface that is rotationally symmetrical. The free-curved surface lenses each has a free-curved surface that is asymmetrical with respect to a first direction and a second direction crossing with each other. A free-curved surface lens satisfying a conditional expression "Dx(SV−SH)/IH>0.08" is arranged on the rear group in the plurality of lens elements.

13 Claims, 48 Drawing Sheets

(51) Int. Cl.
    *H04N 5/225*     (2006.01)
    *H04N 23/58*     (2023.01)

(56) References Cited

U.S. PATENT DOCUMENTS

| | | |
|---|---|---|
| 2010/0079874 A1 | 4/2010 | Kamei |
| 2018/0045922 A1* | 2/2018 | Lai ..................... G02B 27/4211 |
| 2018/0213151 A1* | 7/2018 | Joujiki ............... G02B 13/0045 |
| 2019/0162956 A1 | 5/2019 | Miyamoto |

FOREIGN PATENT DOCUMENTS

| | | |
|---|---|---|
| JP | 2018-101099 | 6/2018 |
| WO | 03/010599 | 2/2003 |
| WO | 2013/065391 | 5/2013 |

OTHER PUBLICATIONS

International Preliminary Report on Patentability dated Jan. 21, 2021 in International (PCT) Patent Application No. PCT/JP2019/025219.

Japanese Office Action dated Feb. 28, 2023 in corresponding Japan Patent Application No. 2020-531201, with English machine translation.

Japanese Office Action dated Jul. 4, 2023 in corresponding Japanese Patent Application No. 2020-531201, with English machine translation.

\* cited by examiner

Fig. 5

| | NUMERICAL EXAMPLE 1 | | | | |
|---|---|---|---|---|---|
| s | SURFACE TYPE | r | d | nd | vd |
| 1 | Spherical surface | -33.317 | 1.000 | 1.77250 | 49.6 |
| 2 | Aspherical surface | 48.939 | 1.030 | | |
| 3 | XY polynomial surface | -57.101 | 2.583 | 1.63450 | 23.9 |
| 4 | XY polynomial surface | 23.256 | 0.882 | | |
| 5 | XY polynomial surface | -13.952 | 1.000 | 1.53459 | 56.3 |
| 6 | XY polynomial surface | 7.193 | 2.488 | | |
| 7 | Spherical surface | 53.94803 | 4.626 | 1.80420 | 46.5 |
| 8 | Spherical surface | -26.259 | 0.522 | | |
| 9 | Spherical surface | 9.350 | 1.766 | 1.80610 | 40.7 |
| 10 | Spherical surface | 31.605 | 2.475 | | |
| 11 | Plane | Diaphragm | 3.441 | | |
| 12 | Spherical surface | 7.157 | 3.187 | 1.58913 | 61.3 |
| 13 | Spherical surface | -8.569 | 0.500 | 1.84666 | 23.8 |
| 14 | Spherical surface | 13.996 | 1.508 | | |
| 15 | Aspherical surface | 8.866 | 1.898 | 1.72916 | 54.7 |
| 16 | Spherical surface | -37.158 | 0.570 | | |
| 17 | XY polynomial surface | 40.569 | 0.876 | 1.63450 | 23.9 |
| 18 | XY polynomial surface | -51.734 | 0.800 | | |
| 19 | XY polynomial surface | 10.178 | 1.308 | 1.53459 | 56.3 |
| 20 | XY polynomial surface | 5.879 | 0.535 | | |

Fig. 6

| NUMERICAL EXAMPLE 1 | |
|---|---|
| F number | 1.80 |
| Vertical half angle of view | 35 |
| Horizontal half angle of view | 50 |
| Vertical image height @ Vertical half angle of view | 2.313 |
| Horizontal image height @ Horizontal half angle of view | 3.070 |
| Horizontal image height @ Vertical half angle of view | 2.644 |
| Optical total length | 36.094 |

Fig. 7

| | s2 (NUMERICAL EXAMPLE 1) |
|---|---|
| K | 0.00000E+00 |
| A4 | 1.58661E-04 |
| A6 | 4.20378E-06 |
| A8 | -2.15475E-07 |
| A10 | 6.95625E-09 |
| A12 | 0.00000E+00 |
| A14 | 0.00000E+00 |
| A16 | 0.00000E+00 |
| A18 | 0.00000E+00 |
| A20 | 0.00000E+00 |

Fig. 8

| s3 | (NUMERICAL EXAMPLE 1) | | | | |
|---|---|---|---|---|---|
| C1 | 0.00000E+00 | C23 | 0.00000E+00 | C45 | -2.50411E-06 |
| C2 | 0.00000E+00 | C24 | -4.60656E-05 | C46 | 0.00000E+00 |
| C3 | 0.00000E+00 | C25 | 0.00000E+00 | C47 | 0.00000E+00 |
| C4 | 8.70819E-03 | C26 | 1.27764E-05 | C48 | 0.00000E+00 |
| C5 | 0.00000E+00 | C27 | 0.00000E+00 | C49 | 0.00000E+00 |
| C6 | 3.51136E-02 | C28 | -6.71623E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.93280E-03 | C33 | 0.00000E+00 | C55 | 0.00000E+00 |
| C12 | 0.00000E+00 | C34 | 0.00000E+00 | C56 | -6.79903E-08 |
| C13 | 3.80168E-03 | C35 | 0.00000E+00 | C57 | 0.00000E+00 |
| C14 | 0.00000E+00 | C36 | 0.00000E+00 | C58 | 3.40536E-08 |
| C15 | -1.73105E-03 | C37 | 7.05910E-07 | C59 | 0.00000E+00 |
| C16 | 0.00000E+00 | C38 | 0.00000E+00 | C60 | 4.57240E-07 |
| C17 | 0.00000E+00 | C39 | 4.19299E-07 | C61 | 0.00000E+00 |
| C18 | 0.00000E+00 | C40 | 0.00000E+00 | C62 | 1.56600E-07 |
| C19 | 0.00000E+00 | C41 | -2.11130E-07 | C63 | 0.00000E+00 |
| C20 | 0.00000E+00 | C42 | 0.00000E+00 | C64 | -1.15470E-07 |
| C21 | 0.00000E+00 | C43 | -8.43234E-07 | C65 | 0.00000E+00 |
| C22 | -7.43488E-05 | C44 | 0.00000E+00 | C66 | 3.41890E-08 |

Fig. 9

| s4 | (NUMERICAL EXAMPLE 1) | | | | |
|---|---|---|---|---|---|
| C1 | 0.00000E+00 | C23 | 0.00000E+00 | C45 | 9.96817E-07 |
| C2 | 0.00000E+00 | C24 | 5.08668E-05 | C46 | 0.00000E+00 |
| C3 | 0.00000E+00 | C25 | 0.00000E+00 | C47 | 0.00000E+00 |
| C4 | -8.22829E-03 | C26 | -1.32673E-04 | C48 | 0.00000E+00 |
| C5 | 0.00000E+00 | C27 | 0.00000E+00 | C49 | 0.00000E+00 |
| C6 | 2.28672E-02 | C28 | 2.05303E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.88724E-03 | C33 | 0.00000E+00 | C55 | 0.00000E+00 |
| C12 | 0.00000E+00 | C34 | 0.00000E+00 | C56 | 8.51459E-08 |
| C13 | 5.75684E-03 | C35 | 0.00000E+00 | C57 | 0.00000E+00 |
| C14 | 0.00000E+00 | C36 | 0.00000E+00 | C58 | -4.20485E-07 |
| C15 | -2.83664E-03 | C37 | -3.29911E-06 | C59 | 0.00000E+00 |
| C16 | 0.00000E+00 | C38 | 0.00000E+00 | C60 | 2.21833E-06 |
| C17 | 0.00000E+00 | C39 | 1.23585E-06 | C61 | 0.00000E+00 |
| C18 | 0.00000E+00 | C40 | 0.00000E+00 | C62 | -8.70405E-07 |
| C19 | 0.00000E+00 | C41 | 1.39632E-05 | C63 | 0.00000E+00 |
| C20 | 0.00000E+00 | C42 | 0.00000E+00 | C64 | 7.27184E-07 |
| C21 | 0.00000E+00 | C43 | -1.64150E-05 | C65 | 0.00000E+00 |
| C22 | -1.09644E-04 | C44 | 0.00000E+00 | C66 | -2.52484E-08 |

Fig. 10

| s5 (NUMERICAL EXAMPLE 1) | | | | | |
|---|---|---|---|---|---|
| C1 | 0.00000E+00 | C23 | 0.00000E+00 | C45 | -5.61082E-06 |
| C2 | 0.00000E+00 | C24 | -3.00634E-06 | C46 | 0.00000E+00 |
| C3 | 0.00000E+00 | C25 | 0.00000E+00 | C47 | 0.00000E+00 |
| C4 | -1.15765E-02 | C26 | -7.00853E-04 | C48 | 0.00000E+00 |
| C5 | 0.00000E+00 | C27 | 0.00000E+00 | C49 | 0.00000E+00 |
| C6 | -1.06090E-02 | C28 | 4.96352E-06 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.11527E-03 | C33 | 0.00000E+00 | C55 | 0.00000E+00 |
| C12 | 0.00000E+00 | C34 | 0.00000E+00 | C56 | -4.63317E-07 |
| C13 | 2.50729E-03 | C35 | 0.00000E+00 | C57 | 0.00000E+00 |
| C14 | 0.00000E+00 | C36 | 0.00000E+00 | C58 | 3.88242E-07 |
| C15 | 4.11983E-03 | C37 | 1.11338E-05 | C59 | 0.00000E+00 |
| C16 | 0.00000E+00 | C38 | 0.00000E+00 | C60 | -6.73147E-07 |
| C17 | 0.00000E+00 | C39 | -1.77313E-05 | C61 | 0.00000E+00 |
| C18 | 0.00000E+00 | C40 | 0.00000E+00 | C62 | -1.64700E-06 |
| C19 | 0.00000E+00 | C41 | 5.00482E-05 | C63 | 0.00000E+00 |
| C20 | 0.00000E+00 | C42 | 0.00000E+00 | C64 | -6.68127E-07 |
| C21 | 0.00000E+00 | C43 | 2.96646E-05 | C65 | 0.00000E+00 |
| C22 | -3.89553E-05 | C44 | 0.00000E+00 | C66 | 1.56304E-07 |

Fig. 11

| s6 | (NUMERICAL EXAMPLE 1) | | | | |
|---|---|---|---|---|---|
| C1 | 0.00000E+00 | C23 | 0.00000E+00 | C45 | -1.61637E-06 |
| C2 | 0.00000E+00 | C24 | -3.95822E-05 | C46 | 0.00000E+00 |
| C3 | 0.00000E+00 | C25 | 0.00000E+00 | C47 | 0.00000E+00 |
| C4 | -7.81639E-03 | C26 | -5.71802E-04 | C48 | 0.00000E+00 |
| C5 | 0.00000E+00 | C27 | 0.00000E+00 | C49 | 0.00000E+00 |
| C6 | -6.56755E-03 | C28 | -1.36233E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 8.19902E-04 | C33 | 0.00000E+00 | C55 | 0.00000E+00 |
| C12 | 0.00000E+00 | C34 | 0.00000E+00 | C56 | -4.06818E-07 |
| C13 | 9.32937E-04 | C35 | 0.00000E+00 | C57 | 0.00000E+00 |
| C14 | 0.00000E+00 | C36 | 0.00000E+00 | C58 | 1.55383E-07 |
| C15 | 3.97022E-03 | C37 | 9.31393E-06 | C59 | 0.00000E+00 |
| C16 | 0.00000E+00 | C38 | 0.00000E+00 | C60 | -7.68721E-07 |
| C17 | 0.00000E+00 | C39 | -2.10683E-05 | C61 | 0.00000E+00 |
| C18 | 0.00000E+00 | C40 | 0.00000E+00 | C62 | -6.18508E-07 |
| C19 | 0.00000E+00 | C41 | 3.06248E-05 | C63 | 0.00000E+00 |
| C20 | 0.00000E+00 | C42 | 0.00000E+00 | C64 | -1.42051E-06 |
| C21 | 0.00000E+00 | C43 | 3.98463E-05 | C65 | 0.00000E+00 |
| C22 | -4.54154E-06 | C44 | 0.00000E+00 | C66 | 1.35941E-07 |

Fig. 12

| | s15 (NUMERICAL EXAMPLE 1) |
|---|---|
| K | 0.00000E+00 |
| A4 | -1.01866E-03 |
| A6 | -1.26546E-05 |
| A8 | -2.44246E-07 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

Fig. 13

| s17 (NUMERICAL EXAMPLE 1) | | | | | |
|---|---|---|---|---|---|
| C1 | 0.00000E+00 | C23 | 0.00000E+00 | C45 | -5.53236E-06 |
| C2 | 0.00000E+00 | C24 | -3.78506E-04 | C46 | 0.00000E+00 |
| C3 | 0.00000E+00 | C25 | 0.00000E+00 | C47 | 0.00000E+00 |
| C4 | -2.07715E-02 | C26 | -4.62082E-05 | C48 | 0.00000E+00 |
| C5 | 0.00000E+00 | C27 | 0.00000E+00 | C49 | 0.00000E+00 |
| C6 | 4.54739E-02 | C28 | 3.52141E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -8.57964E-04 | C33 | 0.00000E+00 | C55 | 0.00000E+00 |
| C12 | 0.00000E+00 | C34 | 0.00000E+00 | C56 | 1.10202E-07 |
| C13 | 9.11621E-03 | C35 | 0.00000E+00 | C57 | 0.00000E+00 |
| C14 | 0.00000E+00 | C36 | 0.00000E+00 | C58 | -2.84337E-07 |
| C15 | 7.27390E-04 | C37 | -5.68309E-06 | C59 | 0.00000E+00 |
| C16 | 0.00000E+00 | C38 | 0.00000E+00 | C60 | 2.46572E-07 |
| C17 | 0.00000E+00 | C39 | 1.21028E-06 | C61 | 0.00000E+00 |
| C18 | 0.00000E+00 | C40 | 0.00000E+00 | C62 | 1.93126E-07 |
| C19 | 0.00000E+00 | C41 | 2.34277E-05 | C63 | 0.00000E+00 |
| C20 | 0.00000E+00 | C42 | 0.00000E+00 | C64 | 2.32691E-07 |
| C21 | 0.00000E+00 | C43 | -1.24214E-05 | C65 | 0.00000E+00 |
| C22 | 7.34064E-05 | C44 | 0.00000E+00 | C66 | -2.46865E-08 |

*Fig. 14*

| s18 | (NUMERICAL EXAMPLE 1) | | | | |
|---|---|---|---|---|---|
| C1 | 0.00000E+00 | C23 | 0.00000E+00 | C45 | -1.57574E-05 |
| C2 | 0.00000E+00 | C24 | -6.46737E-04 | C46 | 0.00000E+00 |
| C3 | 0.00000E+00 | C25 | 0.00000E+00 | C47 | 0.00000E+00 |
| C4 | -5.83105E-03 | C26 | -1.81917E-04 | C48 | 0.00000E+00 |
| C5 | 0.00000E+00 | C27 | 0.00000E+00 | C49 | 0.00000E+00 |
| C6 | 5.56538E-02 | C28 | 4.24924E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.88877E-03 | C33 | 0.00000E+00 | C55 | 0.00000E+00 |
| C12 | 0.00000E+00 | C34 | 0.00000E+00 | C56 | 2.35602E-07 |
| C13 | 1.22382E-02 | C35 | 0.00000E+00 | C57 | 0.00000E+00 |
| C14 | 0.00000E+00 | C36 | 0.00000E+00 | C58 | -9.29058E-08 |
| C15 | 1.24924E-03 | C37 | -1.16786E-05 | C59 | 0.00000E+00 |
| C16 | 0.00000E+00 | C38 | 0.00000E+00 | C60 | -2.36378E-07 |
| C17 | 0.00000E+00 | C39 | 4.26909E-06 | C61 | 0.00000E+00 |
| C18 | 0.00000E+00 | C40 | 0.00000E+00 | C62 | 1.83180E-07 |
| C19 | 0.00000E+00 | C41 | 4.41102E-05 | C63 | 0.00000E+00 |
| C20 | 0.00000E+00 | C42 | 0.00000E+00 | C64 | 5.73798E-07 |
| C21 | 0.00000E+00 | C43 | -1.74904E-05 | C65 | 0.00000E+00 |
| C22 | 1.92473E-04 | C44 | 0.00000E+00 | C66 | 3.61869E-07 |

*Fig. 15*

| s19 (NUMERICAL EXAMPLE 1) | | | | | |
|---|---|---|---|---|---|
| C1 | 0.00000E+00 | C23 | 0.00000E+00 | C45 | 2.52818E-06 |
| C2 | 0.00000E+00 | C24 | 3.26830E-04 | C46 | 0.00000E+00 |
| C3 | 0.00000E+00 | C25 | 0.00000E+00 | C47 | 0.00000E+00 |
| C4 | -1.61905E-02 | C26 | 5.85636E-04 | C48 | 0.00000E+00 |
| C5 | 0.00000E+00 | C27 | 0.00000E+00 | C49 | 0.00000E+00 |
| C6 | -1.42792E-02 | C28 | -4.83758E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 5.70392E-05 | C33 | 0.00000E+00 | C55 | 0.00000E+00 |
| C12 | 0.00000E+00 | C34 | 0.00000E+00 | C56 | -1.80140E-07 |
| C13 | -9.21366E-03 | C35 | 0.00000E+00 | C57 | 0.00000E+00 |
| C14 | 0.00000E+00 | C36 | 0.00000E+00 | C58 | -5.36962E-07 |
| C15 | 1.01367E-04 | C37 | 1.43630E-06 | C59 | 0.00000E+00 |
| C16 | 0.00000E+00 | C38 | 0.00000E+00 | C60 | -1.55747E-06 |
| C17 | 0.00000E+00 | C39 | 4.77196E-06 | C61 | 0.00000E+00 |
| C18 | 0.00000E+00 | C40 | 0.00000E+00 | C62 | -1.88723E-06 |
| C19 | 0.00000E+00 | C41 | 5.01883E-06 | C63 | 0.00000E+00 |
| C20 | 0.00000E+00 | C42 | 0.00000E+00 | C64 | 7.53321E-07 |
| C21 | 0.00000E+00 | C43 | -1.68755E-05 | C65 | 0.00000E+00 |
| C22 | 4.15004E-05 | C44 | 0.00000E+00 | C66 | -1.59806E-07 |

Fig. 16

| s20 (NUMERICAL EXAMPLE 1) | | | | | |
|---|---|---|---|---|---|
| C1 | 0.00000E+00 | C23 | 0.00000E+00 | C45 | 2.48198E-05 |
| C2 | 0.00000E+00 | C24 | 7.34985E-04 | C46 | 0.00000E+00 |
| C3 | 0.00000E+00 | C25 | 0.00000E+00 | C47 | 0.00000E+00 |
| C4 | -4.10622E-02 | C26 | 9.51537E-04 | C48 | 0.00000E+00 |
| C5 | 0.00000E+00 | C27 | 0.00000E+00 | C49 | 0.00000E+00 |
| C6 | 4.43169E-03 | C28 | -3.03721E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.60469E-03 | C33 | 0.00000E+00 | C55 | 0.00000E+00 |
| C12 | 0.00000E+00 | C34 | 0.00000E+00 | C56 | -1.40218E-07 |
| C13 | -2.13540E-02 | C35 | 0.00000E+00 | C57 | 0.00000E+00 |
| C14 | 0.00000E+00 | C36 | 0.00000E+00 | C58 | -4.85925E-07 |
| C15 | -4.91184E-03 | C37 | 1.05768E-05 | C59 | 0.00000E+00 |
| C16 | 0.00000E+00 | C38 | 0.00000E+00 | C60 | 5.63239E-07 |
| C17 | 0.00000E+00 | C39 | -1.41921E-06 | C61 | 0.00000E+00 |
| C18 | 0.00000E+00 | C40 | 0.00000E+00 | C62 | -4.30474E-07 |
| C19 | 0.00000E+00 | C41 | -6.07473E-05 | C63 | 0.00000E+00 |
| C20 | 0.00000E+00 | C42 | 0.00000E+00 | C64 | -3.58419E-07 |
| C21 | 0.00000E+00 | C43 | -4.40513E-07 | C65 | 0.00000E+00 |
| C22 | -3.85594E-04 | C44 | 0.00000E+00 | C66 | -6.17931E-07 |

*Fig. 18*

| | | NUMERICAL EXAMPLE 1 | NUMERICAL EXAMPLE 2 | NUMERICAL EXAMPLE 3 |
|---|---|---|---|---|
| CONDITION (1) | L8R1 | | | 0.011 |
| | L8R2 | | | -0.031 |
| | L9R1 | 0.176 | 0.097 | 0.103 |
| | L9R2 | -0.176 | -0.094 | -0.110 |
| | L10R1 | -0.001 | -0.020 | |
| | L10R2 | -0.032 | -0.011 | |
| CONDITION (2) | L8R1 | | | 0.008 |
| | L8R2 | | | -0.022 |
| | L9R1 | 0.087 | 0.059 | 0.069 |
| | L9R2 | -0.084 | -0.055 | -0.080 |
| | L10R1 | 0.002 | -0.008 | |
| | L10R2 | -0.045 | -0.037 | |
| CONDITION (3) | | 6.22310 | 6.08826 | 5.87000 |
| CONDITION (4) | | 1.77250 | 1.77250 | 1.69680 |
| CONDITION (5) | L2 | 1.63450 | 1.63450 | 1.63450 |
| | L3 | 1.53459 | 1.53459 | |
| | L8 | | | 1.53459 |
| | L9 | 1.63450 | 1.63450 | 1.63450 |
| | L10 | 1.53459 | 1.53459 | |
| CONDITION (6) | L2 | 23.8527 | 23.8527 | 23.8527 |
| | L3 | 56.3421 | 56.3421 | |
| | L8 | | | 56.3421 |
| | L9 | 23.8527 | 23.8527 | 23.8527 |
| | L10 | 56.3421 | 56.3421 | |

Fig. 21

| NUMERICAL EXAMPLE 2 | | | | | |
|---|---|---|---|---|---|
| s | SURFACE TYPE | r | d | nd | vd |
| 1 | Spherical surface | -123.866 | 1.000 | 1.77250 | 49.6 |
| 2 | Aspherical surface | 15.031 | 1.639 | | |
| 3 | XY polynomial surface | 28.216 | 1.788 | 1.63450 | 23.9 |
| 4 | XY polynomial surface | 13.296 | 1.190 | | |
| 5 | XY polynomial surface | -293.593 | 1.000 | 1.53459 | 56.3 |
| 6 | XY polynomial surface | 6.767 | 2.378 | | |
| 7 | Spherical surface | -1420.14 | 4.891 | 1.80420 | 46.5 |
| 8 | Spherical surface | -50.288 | 0.547 | | |
| 9 | Spherical surface | 10.855 | 1.620 | 1.80610 | 40.7 |
| 10 | Spherical surface | 201.390 | 1.244 | | |
| 11 | Plane | Diaphragm | 4.360 | | |
| 12 | Spherical surface | 7.823 | 5.000 | 1.58913 | 61.3 |
| 13 | Spherical surface | -8.018 | 0.500 | 1.84666 | 23.8 |
| 14 | Spherical surface | 17.310 | 0.948 | | |
| 15 | Aspherical surface | 7.813 | 2.123 | 1.72916 | 54.7 |
| 16 | Spherical surface | -62.087 | 0.550 | | |
| 17 | XY polynomial surface | 20.925 | 1.104 | 1.63450 | 23.9 |
| 18 | XY polynomial surface | 49.795 | 0.799 | | |
| 19 | XY polynomial surface | 20.936 | 1.385 | 1.53459 | 56.3 |
| 20 | XY polynomial surface | 9.256 | 0.337 | | |

Fig. 22

| NUMERICAL EXAMPLE 2 | |
|---|---|
| F number | 1.80 |
| Vertical half angle of view | 37.5 |
| Horizontal half angle of view | 50 |
| Vertical image height @ Vertical half angle of view | 2.396 |
| Horizontal image height @ Horizontal half angle of view | 3.070 |
| Horizontal image height @ Vertical half angle of view | 2.667 |
| Optical total length | 37.504 |

Fig. 23

| | s2 (NUMERICAL EXAMPLE 2) |
|---|---|
| K | 0.00000E+00 |
| A4 | -6.89286E-05 |
| A6 | 3.45670E-05 |
| A8 | -2.45562E-07 |
| A10 | 1.47812E-08 |
| A12 | 0.00000E+00 |
| A14 | 0.00000E+00 |
| A16 | 0.00000E+00 |
| A18 | 0.00000E+00 |
| A20 | 0.00000E+00 |

Fig. 24

| s3 (NUMERICAL EXAMPLE 2) | | | | | |
|---|---|---|---|---|---|
| C1 | 0.00000E+00 | C23 | 0.00000E+00 | C45 | 3.43455E-06 |
| C2 | 0.00000E+00 | C24 | 2.46416E-04 | C46 | 0.00000E+00 |
| C3 | 0.00000E+00 | C25 | 0.00000E+00 | C47 | 0.00000E+00 |
| C4 | -7.96560E-03 | C26 | 1.68671E-04 | C48 | 0.00000E+00 |
| C5 | 0.00000E+00 | C27 | 0.00000E+00 | C49 | 0.00000E+00 |
| C6 | 2.61206E-02 | C28 | -1.52109E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 6.36465E-04 | C33 | 0.00000E+00 | C55 | 0.00000E+00 |
| C12 | 0.00000E+00 | C34 | 0.00000E+00 | C56 | 4.35492E-08 |
| C13 | 4.69875E-03 | C35 | 0.00000E+00 | C57 | 0.00000E+00 |
| C14 | 0.00000E+00 | C36 | 0.00000E+00 | C58 | 3.13561E-08 |
| C15 | -9.57987E-04 | C37 | -3.30748E-06 | C59 | 0.00000E+00 |
| C16 | 0.00000E+00 | C38 | 0.00000E+00 | C60 | 5.43358E-07 |
| C17 | 0.00000E+00 | C39 | -1.17833E-05 | C61 | 0.00000E+00 |
| C18 | 0.00000E+00 | C40 | 0.00000E+00 | C62 | 9.51790E-08 |
| C19 | 0.00000E+00 | C41 | -7.26048E-06 | C63 | 0.00000E+00 |
| C20 | 0.00000E+00 | C42 | 0.00000E+00 | C64 | -7.11968E-07 |
| C21 | 0.00000E+00 | C43 | -1.04499E-06 | C65 | 0.00000E+00 |
| C22 | 2.13716E-05 | C44 | 0.00000E+00 | C66 | -8.57735E-08 |

Fig. 25

| s4 | (NUMERICAL EXAMPLE 2) | | | | |
|---|---|---|---|---|---|
| C1 | 0.00000E+00 | C23 | 0.00000E+00 | C45 | 2.77782E-05 |
| C2 | 0.00000E+00 | C24 | 3.81764E-04 | C46 | 0.00000E+00 |
| C3 | 0.00000E+00 | C25 | 0.00000E+00 | C47 | 0.00000E+00 |
| C4 | -2.18400E-02 | C26 | 4.71471E-05 | C48 | 0.00000E+00 |
| C5 | 0.00000E+00 | C27 | 0.00000E+00 | C49 | 0.00000E+00 |
| C6 | 1.44664E-02 | C28 | -3.75517E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.25214E-03 | C33 | 0.00000E+00 | C55 | 0.00000E+00 |
| C12 | 0.00000E+00 | C34 | 0.00000E+00 | C56 | -2.29959E-08 |
| C13 | 1.04847E-02 | C35 | 0.00000E+00 | C57 | 0.00000E+00 |
| C14 | 0.00000E+00 | C36 | 0.00000E+00 | C58 | -3.92882E-07 |
| C15 | 4.90068E-04 | C37 | -3.10984E-07 | C59 | 0.00000E+00 |
| C16 | 0.00000E+00 | C38 | 0.00000E+00 | C60 | 1.60861E-06 |
| C17 | 0.00000E+00 | C39 | -2.31732E-05 | C61 | 0.00000E+00 |
| C18 | 0.00000E+00 | C40 | 0.00000E+00 | C62 | 1.04392E-06 |
| C19 | 0.00000E+00 | C41 | -2.11496E-05 | C63 | 0.00000E+00 |
| C20 | 0.00000E+00 | C42 | 0.00000E+00 | C64 | 1.50273E-06 |
| C21 | 0.00000E+00 | C43 | -5.17872E-05 | C65 | 0.00000E+00 |
| C22 | -1.66045E-05 | C44 | 0.00000E+00 | C66 | -7.00332E-07 |

Fig. 26

| s5 | (NUMERICAL EXAMPLE 2) | | | | |
|---|---|---|---|---|---|
| C1 | 0.00000E+00 | C23 | 0.00000E+00 | C45 | -6.60217E-06 |
| C2 | 0.00000E+00 | C24 | -3.03718E-04 | C46 | 0.00000E+00 |
| C3 | 0.00000E+00 | C25 | 0.00000E+00 | C47 | 0.00000E+00 |
| C4 | -1.55947E-02 | C26 | -1.02448E-03 | C48 | 0.00000E+00 |
| C5 | 0.00000E+00 | C27 | 0.00000E+00 | C49 | 0.00000E+00 |
| C6 | -1.01780E-02 | C28 | 1.54735E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.13651E-03 | C33 | 0.00000E+00 | C55 | 0.00000E+00 |
| C12 | 0.00000E+00 | C34 | 0.00000E+00 | C56 | -4.28931E-08 |
| C13 | 9.24261E-03 | C35 | 0.00000E+00 | C57 | 0.00000E+00 |
| C14 | 0.00000E+00 | C36 | 0.00000E+00 | C58 | -1.26331E-06 |
| C15 | 2.94423E-03 | C37 | -3.70382E-06 | C59 | 0.00000E+00 |
| C16 | 0.00000E+00 | C38 | 0.00000E+00 | C60 | -1.70833E-06 |
| C17 | 0.00000E+00 | C39 | 2.28449E-05 | C61 | 0.00000E+00 |
| C18 | 0.00000E+00 | C40 | 0.00000E+00 | C62 | -1.25991E-06 |
| C19 | 0.00000E+00 | C41 | 7.13570E-05 | C63 | 0.00000E+00 |
| C20 | 0.00000E+00 | C42 | 0.00000E+00 | C64 | -1.88192E-07 |
| C21 | 0.00000E+00 | C43 | 3.56791E-05 | C65 | 0.00000E+00 |
| C22 | 1.68839E-04 | C44 | 0.00000E+00 | C66 | 6.81136E-08 |

Fig. 27

| s6 | (NUMERICAL EXAMPLE 2) | | | | |
|---|---|---|---|---|---|
| C1 | 0.00000E+00 | C23 | 0.00000E+00 | C45 | -2.87167E-05 |
| C2 | 0.00000E+00 | C24 | -3.78056E-04 | C46 | 0.00000E+00 |
| C3 | 0.00000E+00 | C25 | 0.00000E+00 | C47 | 0.00000E+00 |
| C4 | -6.51070E-03 | C26 | -8.03015E-04 | C48 | 0.00000E+00 |
| C5 | 0.00000E+00 | C27 | 0.00000E+00 | C49 | 0.00000E+00 |
| C6 | -4.51176E-04 | C28 | 2.97936E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.41802E-03 | C33 | 0.00000E+00 | C55 | 0.00000E+00 |
| C12 | 0.00000E+00 | C34 | 0.00000E+00 | C56 | 5.32911E-08 |
| C13 | 3.70694E-03 | C35 | 0.00000E+00 | C57 | 0.00000E+00 |
| C14 | 0.00000E+00 | C36 | 0.00000E+00 | C58 | -1.48204E-06 |
| C15 | 1.00518E-03 | C37 | -6.45702E-06 | C59 | 0.00000E+00 |
| C16 | 0.00000E+00 | C38 | 0.00000E+00 | C60 | -3.16334E-06 |
| C17 | 0.00000E+00 | C39 | 3.23276E-05 | C61 | 0.00000E+00 |
| C18 | 0.00000E+00 | C40 | 0.00000E+00 | C62 | -1.30464E-06 |
| C19 | 0.00000E+00 | C41 | 7.32068E-05 | C63 | 0.00000E+00 |
| C20 | 0.00000E+00 | C42 | 0.00000E+00 | C64 | -8.02146E-07 |
| C21 | 0.00000E+00 | C43 | 4.96866E-05 | C65 | 0.00000E+00 |
| C22 | 1.55296E-04 | C44 | 0.00000E+00 | C66 | 9.96961E-07 |

Fig. 28

| | s15 (NUMERICAL EXAMPLE 2) |
|---|---|
| K | 0.00000E+00 |
| A4 | -8.12619E-04 |
| A6 | 1.24476E-05 |
| A8 | -1.31905E-06 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

Fig. 29

| s17 (NUMERICAL EXAMPLE 2) | | | | | |
|---|---|---|---|---|---|
| C1 | 0.00000E+00 | C23 | 0.00000E+00 | C45 | -9.30209E-06 |
| C2 | 0.00000E+00 | C24 | -9.84314E-04 | C46 | 0.00000E+00 |
| C3 | 0.00000E+00 | C25 | 0.00000E+00 | C47 | 0.00000E+00 |
| C4 | -1.80153E-02 | C26 | -9.25500E-04 | C48 | 0.00000E+00 |
| C5 | 0.00000E+00 | C27 | 0.00000E+00 | C49 | 0.00000E+00 |
| C6 | 2.90665E-02 | C28 | -3.97094E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -7.17537E-04 | C33 | 0.00000E+00 | C55 | 0.00000E+00 |
| C12 | 0.00000E+00 | C34 | 0.00000E+00 | C56 | -7.37155E-08 |
| C13 | 8.24228E-03 | C35 | 0.00000E+00 | C57 | 0.00000E+00 |
| C14 | 0.00000E+00 | C36 | 0.00000E+00 | C58 | -5.53764E-07 |
| C15 | 5.60478E-05 | C37 | 2.24559E-06 | C59 | 0.00000E+00 |
| C16 | 0.00000E+00 | C38 | 0.00000E+00 | C60 | -1.91997E-06 |
| C17 | 0.00000E+00 | C39 | 4.12103E-05 | C61 | 0.00000E+00 |
| C18 | 0.00000E+00 | C40 | 0.00000E+00 | C62 | -2.40938E-06 |
| C19 | 0.00000E+00 | C41 | 9.90322E-05 | C63 | 0.00000E+00 |
| C20 | 0.00000E+00 | C42 | 0.00000E+00 | C64 | -2.73428E-07 |
| C21 | 0.00000E+00 | C43 | 2.75794E-05 | C65 | 0.00000E+00 |
| C22 | -1.58610E-05 | C44 | 0.00000E+00 | C66 | 2.55922E-07 |

Fig. 30

| s18 | (NUMERICAL EXAMPLE 2) | | | | |
|---|---|---|---|---|---|
| C1 | 0.00000E+00 | C23 | 0.00000E+00 | C45 | -1.59014E-05 |
| C2 | 0.00000E+00 | C24 | -1.65072E-03 | C46 | 0.00000E+00 |
| C3 | 0.00000E+00 | C25 | 0.00000E+00 | C47 | 0.00000E+00 |
| C4 | -6.75598E-03 | C26 | -1.63682E-03 | C48 | 0.00000E+00 |
| C5 | 0.00000E+00 | C27 | 0.00000E+00 | C49 | 0.00000E+00 |
| C6 | 3.53136E-02 | C28 | 3.75808E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.95526E-03 | C33 | 0.00000E+00 | C55 | 0.00000E+00 |
| C12 | 0.00000E+00 | C34 | 0.00000E+00 | C56 | 1.64584E-07 |
| C13 | 1.36881E-02 | C35 | 0.00000E+00 | C57 | 0.00000E+00 |
| C14 | 0.00000E+00 | C36 | 0.00000E+00 | C58 | -7.77229E-07 |
| C15 | 1.36897E-04 | C37 | -1.08116E-05 | C59 | 0.00000E+00 |
| C16 | 0.00000E+00 | C38 | 0.00000E+00 | C60 | -3.58789E-06 |
| C17 | 0.00000E+00 | C39 | 6.29769E-05 | C61 | 0.00000E+00 |
| C18 | 0.00000E+00 | C40 | 0.00000E+00 | C62 | -4.15122E-06 |
| C19 | 0.00000E+00 | C41 | 1.72444E-04 | C63 | 0.00000E+00 |
| C20 | 0.00000E+00 | C42 | 0.00000E+00 | C64 | -7.82370E-07 |
| C21 | 0.00000E+00 | C43 | 5.83416E-05 | C65 | 0.00000E+00 |
| C22 | 2.08821E-04 | C44 | 0.00000E+00 | C66 | 4.06089E-07 |

Fig. 31

| s19 (NUMERICAL EXAMPLE 2) | | | | | |
|---|---|---|---|---|---|
| C1 | 0.00000E+00 | C23 | 0.00000E+00 | C45 | 8.07240E-06 |
| C2 | 0.00000E+00 | C24 | -1.16698E-04 | C46 | 0.00000E+00 |
| C3 | 0.00000E+00 | C25 | 0.00000E+00 | C47 | 0.00000E+00 |
| C4 | -6.04169E-04 | C26 | 3.39899E-04 | C48 | 0.00000E+00 |
| C5 | 0.00000E+00 | C27 | 0.00000E+00 | C49 | 0.00000E+00 |
| C6 | -4.78915E-03 | C28 | 1.47623E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.25682E-03 | C33 | 0.00000E+00 | C55 | 0.00000E+00 |
| C12 | 0.00000E+00 | C34 | 0.00000E+00 | C56 | 1.10566E-07 |
| C13 | -9.74479E-03 | C35 | 0.00000E+00 | C57 | 0.00000E+00 |
| C14 | 0.00000E+00 | C36 | 0.00000E+00 | C58 | -9.34409E-08 |
| C15 | -2.81708E-03 | C37 | -7.86197E-06 | C59 | 0.00000E+00 |
| C16 | 0.00000E+00 | C38 | 0.00000E+00 | C60 | -1.29893E-06 |
| C17 | 0.00000E+00 | C39 | 1.28338E-05 | C61 | 0.00000E+00 |
| C18 | 0.00000E+00 | C40 | 0.00000E+00 | C62 | -1.11226E-06 |
| C19 | 0.00000E+00 | C41 | 5.74595E-05 | C63 | 0.00000E+00 |
| C20 | 0.00000E+00 | C42 | 0.00000E+00 | C64 | -8.85236E-07 |
| C21 | 0.00000E+00 | C43 | 1.84837E-05 | C65 | 0.00000E+00 |
| C22 | 1.37489E-04 | C44 | 0.00000E+00 | C66 | -5.61852E-07 |

Fig. 32

| s20 | (NUMERICAL EXAMPLE 2) | | | | |
|---|---|---|---|---|---|
| C1 | 0.00000E+00 | C23 | 0.00000E+00 | C45 | 5.11370E-05 |
| C2 | 0.00000E+00 | C24 | 6.45334E-04 | C46 | 0.00000E+00 |
| C3 | 0.00000E+00 | C25 | 0.00000E+00 | C47 | 0.00000E+00 |
| C4 | -2.25296E-02 | C26 | 1.44201E-03 | C48 | 0.00000E+00 |
| C5 | 0.00000E+00 | C27 | 0.00000E+00 | C49 | 0.00000E+00 |
| C6 | 2.04358E-02 | C28 | -3.41119E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 1.83744E-03 | C33 | 0.00000E+00 | C55 | 0.00000E+00 |
| C12 | 0.00000E+00 | C34 | 0.00000E+00 | C56 | -3.89603E-07 |
| C13 | -2.27192E-02 | C35 | 0.00000E+00 | C57 | 0.00000E+00 |
| C14 | 0.00000E+00 | C36 | 0.00000E+00 | C58 | -5.62224E-07 |
| C15 | -6.88585E-03 | C37 | 2.43212E-05 | C59 | 0.00000E+00 |
| C16 | 0.00000E+00 | C38 | 0.00000E+00 | C60 | 6.33233E-07 |
| C17 | 0.00000E+00 | C39 | 9.45894E-06 | C61 | 0.00000E+00 |
| C18 | 0.00000E+00 | C40 | 0.00000E+00 | C62 | 1.83147E-06 |
| C19 | 0.00000E+00 | C41 | -5.27832E-05 | C63 | 0.00000E+00 |
| C20 | 0.00000E+00 | C42 | 0.00000E+00 | C64 | -8.79758E-07 |
| C21 | 0.00000E+00 | C43 | -9.90010E-06 | C65 | 0.00000E+00 |
| C22 | -5.46746E-04 | C44 | 0.00000E+00 | C66 | -1.54331E-06 |

Fig. 36

| NUMERICAL EXAMPLE 3 | | | | | |
|---|---|---|---|---|---|
| s | SURFACE TYPE | r | d | nd | vd |
| 1 | Spherical surface | −53.019 | 1.500 | 1.69680 | 55.5 |
| 2 | Aspherical surface | 11.256 | 2.800 | | |
| 3 | XY polynomial surface | 60.688 | 0.996 | 1.63450 | 23.9 |
| 4 | XY polynomial surface | 32.629 | 0.900 | | |
| 5 | Aspherical surface | 43.639 | 1.000 | 1.49710 | 81.6 |
| 6 | Spherical surface | 6.103 | 4.038 | | |
| 7 | Spherical surface | 11.8505 | 1.939 | 1.80420 | 46.5 |
| 8 | Spherical surface | −29.845 | 1.641 | | |
| 9 | Plane | Diaphragm | 3.563 | | |
| 10 | Spherical surface | 16.306 | 3.500 | 1.69680 | 55.5 |
| 11 | Spherical surface | −6.757 | 0.700 | 1.92285 | 20.9 |
| 12 | Spherical surface | −32.926 | 0.277 | | |
| 13 | Spherical surface | 11.244 | 1.724 | 1.80420 | 46.5 |
| 14 | Aspherical surface | 119.807 | 1.100 | | |
| 15 | XY polynomial surface | 26.524 | 2.243 | 1.53459 | 56.3 |
| 16 | XY polynomial surface | 55.860 | 0.738 | | |
| 17 | XY polynomial surface | 48.282 | 1.159 | 1.63450 | 23.9 |
| 18 | XY polynomial surface | 16.884 | 0.211 | | |

Fig. 37

| NUMERICAL EXAMPLE 3 | |
|---|---|
| F number | 1.80 |
| Vertical half angle of view | 35 |
| Horizontal half angle of view | 50 |
| Vertical image height @ Vertical half angle of view | 2.365 |
| Horizontal image height @ Horizontal half angle of view | 3.070 |
| Horizontal image height @ Vertical half angle of view | 2.478 |
| Optical total length | 33.128 |

Fig. 38

| | s2 (NUMERICAL EXAMPLE 3) |
|---|---|
| K | 0.00000E+00 |
| A4 | 7.80093E-04 |
| A6 | 3.78983E-05 |
| A8 | 5.88352E-08 |
| A10 | 1.69250E-08 |
| A12 | 0.00000E+00 |
| A14 | 0.00000E+00 |
| A16 | 0.00000E+00 |
| A18 | 0.00000E+00 |
| A20 | 0.00000E+00 |

Fig. 39

| s3 (NUMERICAL EXAMPLE 3) | | | | | |
|---|---|---|---|---|---|
| C1 | 0.00000E+00 | C23 | 0.00000E+00 | C45 | -3.42074E-07 |
| C2 | 0.00000E+00 | C24 | 2.87717E-04 | C46 | 0.00000E+00 |
| C3 | 0.00000E+00 | C25 | 0.00000E+00 | C47 | 0.00000E+00 |
| C4 | -1.69447E-02 | C26 | 3.91908E-04 | C48 | 0.00000E+00 |
| C5 | 0.00000E+00 | C27 | 0.00000E+00 | C49 | 0.00000E+00 |
| C6 | 4.38426E-03 | C28 | -5.26452E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.12143E-03 | C33 | 0.00000E+00 | C55 | 0.00000E+00 |
| C12 | 0.00000E+00 | C34 | 0.00000E+00 | C56 | 5.55396E-08 |
| C13 | 7.27319E-03 | C35 | 0.00000E+00 | C57 | 0.00000E+00 |
| C14 | 0.00000E+00 | C36 | 0.00000E+00 | C58 | 3.22552E-07 |
| C15 | -2.15585E-04 | C37 | -4.99176E-06 | C59 | 0.00000E+00 |
| C16 | 0.00000E+00 | C38 | 0.00000E+00 | C60 | 1.46616E-06 |
| C17 | 0.00000E+00 | C39 | -1.61727E-05 | C61 | 0.00000E+00 |
| C18 | 0.00000E+00 | C40 | 0.00000E+00 | C62 | 7.97468E-07 |
| C19 | 0.00000E+00 | C41 | -2.77183E-05 | C63 | 0.00000E+00 |
| C20 | 0.00000E+00 | C42 | 0.00000E+00 | C64 | -2.56401E-07 |
| C21 | 0.00000E+00 | C43 | -1.55656E-05 | C65 | 0.00000E+00 |
| C22 | 7.02728E-05 | C44 | 0.00000E+00 | C66 | -1.08628E-07 |

Fig. 40

| s4 | (NUMERICAL EXAMPLE 3) | | | | |
|---|---|---|---|---|---|
| C1 | 0.00000E+00 | C23 | 0.00000E+00 | C45 | 5.19169E-07 |
| C2 | 0.00000E+00 | C24 | 2.49053E-04 | C46 | 0.00000E+00 |
| C3 | 0.00000E+00 | C25 | 0.00000E+00 | C47 | 0.00000E+00 |
| C4 | -2.58170E-02 | C26 | 3.29857E-04 | C48 | 0.00000E+00 |
| C5 | 0.00000E+00 | C27 | 0.00000E+00 | C49 | 0.00000E+00 |
| C6 | -3.93165E-03 | C28 | -7.79134E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.81660E-03 | C33 | 0.00000E+00 | C55 | 0.00000E+00 |
| C12 | 0.00000E+00 | C34 | 0.00000E+00 | C56 | -4.44467E-08 |
| C13 | 8.86261E-03 | C35 | 0.00000E+00 | C57 | 0.00000E+00 |
| C14 | 0.00000E+00 | C36 | 0.00000E+00 | C58 | -3.84933E-07 |
| C15 | 6.38960E-04 | C37 | -3.12337E-06 | C59 | 0.00000E+00 |
| C16 | 0.00000E+00 | C38 | 0.00000E+00 | C60 | 6.49462E-07 |
| C17 | 0.00000E+00 | C39 | -2.44036E-06 | C61 | 0.00000E+00 |
| C18 | 0.00000E+00 | C40 | 0.00000E+00 | C62 | -9.49288E-07 |
| C19 | 0.00000E+00 | C41 | -2.43995E-06 | C63 | 0.00000E+00 |
| C20 | 0.00000E+00 | C42 | 0.00000E+00 | C64 | -9.42545E-07 |
| C21 | 0.00000E+00 | C43 | -6.59435E-06 | C65 | 0.00000E+00 |
| C22 | 5.03709E-05 | C44 | 0.00000E+00 | C66 | -1.58067E-08 |

Fig. 41

| | s5 (NUMERICAL EXAMPLE 3) |
|---|---|
| K | 0.00000E+00 |
| A4 | 1.89919E-03 |
| A6 | -2.09068E-05 |
| A8 | 3.01922E-06 |
| A10 | -1.26172E-07 |
| A12 | 0.00000E+00 |
| A14 | 0.00000E+00 |
| A16 | 0.00000E+00 |
| A18 | 0.00000E+00 |
| A20 | 0.00000E+00 |

Fig. 42

| | s14 (NUMERICAL EXAMPLE 3) |
|---|---|
| K | 0.00000E+00 |
| A4 | 2.04639E-04 |
| A6 | 7.38409E-06 |
| A8 | 7.73361E-08 |
| A10 | 0.00000E+00 |
| A12 | 0.00000E+00 |
| A14 | 0.00000E+00 |
| A16 | 0.00000E+00 |
| A18 | 0.00000E+00 |
| A20 | 0.00000E+00 |

Fig. 43

| s15 (NUMERICAL EXAMPLE 3) | | | | | |
|---|---|---|---|---|---|
| C1 | 0.00000E+00 | C23 | 0.00000E+00 | C45 | -2.36863E-07 |
| C2 | 0.00000E+00 | C24 | 3.69311E-06 | C46 | 0.00000E+00 |
| C3 | 0.00000E+00 | C25 | 0.00000E+00 | C47 | 0.00000E+00 |
| C4 | -9.92724E-03 | C26 | -2.01230E-04 | C48 | 0.00000E+00 |
| C5 | 0.00000E+00 | C27 | 0.00000E+00 | C49 | 0.00000E+00 |
| C6 | -2.65776E-03 | C28 | 5.90256E-07 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -6.94783E-04 | C33 | 0.00000E+00 | C55 | 0.00000E+00 |
| C12 | 0.00000E+00 | C34 | 0.00000E+00 | C56 | -4.66131E-08 |
| C13 | 2.22104E-03 | C35 | 0.00000E+00 | C57 | 0.00000E+00 |
| C14 | 0.00000E+00 | C36 | 0.00000E+00 | C58 | -4.00136E-07 |
| C15 | -1.05152E-03 | C37 | -7.04959E-08 | C59 | 0.00000E+00 |
| C16 | 0.00000E+00 | C38 | 0.00000E+00 | C60 | -1.58873E-06 |
| C17 | 0.00000E+00 | C39 | 1.96866E-06 | C61 | 0.00000E+00 |
| C18 | 0.00000E+00 | C40 | 0.00000E+00 | C62 | -2.76551E-06 |
| C19 | 0.00000E+00 | C41 | 3.18130E-05 | C63 | 0.00000E+00 |
| C20 | 0.00000E+00 | C42 | 0.00000E+00 | C64 | -5.06976E-07 |
| C21 | 0.00000E+00 | C43 | 1.09658E-05 | C65 | 0.00000E+00 |
| C22 | 2.17387E-05 | C44 | 0.00000E+00 | C66 | -5.28273E-08 |

Fig. 44

| s16 | (NUMERICAL EXAMPLE 3) | | | | |
|---|---|---|---|---|---|
| C1 | 0.00000E+00 | C23 | 0.00000E+00 | C45 | 7.37672E-06 |
| C2 | 0.00000E+00 | C24 | 2.54556E-04 | C46 | 0.00000E+00 |
| C3 | 0.00000E+00 | C25 | 0.00000E+00 | C47 | 0.00000E+00 |
| C4 | -1.21182E-02 | C26 | -1.03607E-04 | C48 | 0.00000E+00 |
| C5 | 0.00000E+00 | C27 | 0.00000E+00 | C49 | 0.00000E+00 |
| C6 | 6.83457E-03 | C28 | -8.71047E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -1.68611E-03 | C33 | 0.00000E+00 | C55 | 0.00000E+00 |
| C12 | 0.00000E+00 | C34 | 0.00000E+00 | C56 | 1.71803E-07 |
| C13 | -8.62540E-04 | C35 | 0.00000E+00 | C57 | 0.00000E+00 |
| C14 | 0.00000E+00 | C36 | 0.00000E+00 | C58 | -5.41950E-07 |
| C15 | -2.15075E-03 | C37 | -4.61405E-06 | C59 | 0.00000E+00 |
| C16 | 0.00000E+00 | C38 | 0.00000E+00 | C60 | -4.44681E-07 |
| C17 | 0.00000E+00 | C39 | -6.90344E-06 | C61 | 0.00000E+00 |
| C18 | 0.00000E+00 | C40 | 0.00000E+00 | C62 | -3.20739E-06 |
| C19 | 0.00000E+00 | C41 | 2.46566E-05 | C63 | 0.00000E+00 |
| C20 | 0.00000E+00 | C42 | 0.00000E+00 | C64 | -1.29489E-06 |
| C21 | 0.00000E+00 | C43 | 3.00635E-05 | C65 | 0.00000E+00 |
| C22 | 7.66004E-05 | C44 | 0.00000E+00 | C66 | -1.92653E-07 |

*Fig. 45*

| s17 (NUMERICAL EXAMPLE 3) | | | | | |
|---|---|---|---|---|---|
| C1 | 0.00000E+00 | C23 | 0.00000E+00 | C45 | 2.63883E-05 |
| C2 | 0.00000E+00 | C24 | 1.48327E-03 | C46 | 0.00000E+00 |
| C3 | 0.00000E+00 | C25 | 0.00000E+00 | C47 | 0.00000E+00 |
| C4 | -6.48692E-02 | C26 | 1.91685E-03 | C48 | 0.00000E+00 |
| C5 | 0.00000E+00 | C27 | 0.00000E+00 | C49 | 0.00000E+00 |
| C6 | -4.44723E-03 | C28 | -1.51769E-04 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | 2.33299E-04 | C33 | 0.00000E+00 | C55 | 0.00000E+00 |
| C12 | 0.00000E+00 | C34 | 0.00000E+00 | C56 | -1.51158E-08 |
| C13 | -2.32622E-02 | C35 | 0.00000E+00 | C57 | 0.00000E+00 |
| C14 | 0.00000E+00 | C36 | 0.00000E+00 | C58 | -1.32502E-06 |
| C15 | -2.41680E-03 | C37 | 6.04947E-06 | C59 | 0.00000E+00 |
| C16 | 0.00000E+00 | C38 | 0.00000E+00 | C60 | 4.58805E-07 |
| C17 | 0.00000E+00 | C39 | -1.09388E-06 | C61 | 0.00000E+00 |
| C18 | 0.00000E+00 | C40 | 0.00000E+00 | C62 | -1.92032E-06 |
| C19 | 0.00000E+00 | C41 | -4.42660E-05 | C63 | 0.00000E+00 |
| C20 | 0.00000E+00 | C42 | 0.00000E+00 | C64 | -2.65324E-06 |
| C21 | 0.00000E+00 | C43 | 2.41850E-05 | C65 | 0.00000E+00 |
| C22 | -3.40198E-05 | C44 | 0.00000E+00 | C66 | -7.76586E-07 |

Fig. 46

| s18 | (NUMERICAL EXAMPLE 3) | | | | |
|---|---|---|---|---|---|
| C1 | 0.00000E+00 | C23 | 0.00000E+00 | C45 | 2.80792E-05 |
| C2 | 0.00000E+00 | C24 | 1.70265E-03 | C46 | 0.00000E+00 |
| C3 | 0.00000E+00 | C25 | 0.00000E+00 | C47 | 0.00000E+00 |
| C4 | -6.66337E-02 | C26 | 2.61716E-03 | C48 | 0.00000E+00 |
| C5 | 0.00000E+00 | C27 | 0.00000E+00 | C49 | 0.00000E+00 |
| C6 | 5.86128E-03 | C28 | -8.72915E-05 | C50 | 0.00000E+00 |
| C7 | 0.00000E+00 | C29 | 0.00000E+00 | C51 | 0.00000E+00 |
| C8 | 0.00000E+00 | C30 | 0.00000E+00 | C52 | 0.00000E+00 |
| C9 | 0.00000E+00 | C31 | 0.00000E+00 | C53 | 0.00000E+00 |
| C10 | 0.00000E+00 | C32 | 0.00000E+00 | C54 | 0.00000E+00 |
| C11 | -9.94551E-05 | C33 | 0.00000E+00 | C55 | 0.00000E+00 |
| C12 | 0.00000E+00 | C34 | 0.00000E+00 | C56 | -1.21409E-07 |
| C13 | -2.59526E-02 | C35 | 0.00000E+00 | C57 | 0.00000E+00 |
| C14 | 0.00000E+00 | C36 | 0.00000E+00 | C58 | -2.58648E-07 |
| C15 | -5.17151E-03 | C37 | 9.54283E-06 | C59 | 0.00000E+00 |
| C16 | 0.00000E+00 | C38 | 0.00000E+00 | C60 | 5.67939E-06 |
| C17 | 0.00000E+00 | C39 | -2.19097E-05 | C61 | 0.00000E+00 |
| C18 | 0.00000E+00 | C40 | 0.00000E+00 | C62 | 8.65128E-06 |
| C19 | 0.00000E+00 | C41 | -1.83934E-04 | C63 | 0.00000E+00 |
| C20 | 0.00000E+00 | C42 | 0.00000E+00 | C64 | 2.88091E-07 |
| C21 | 0.00000E+00 | C43 | -5.66726E-05 | C65 | 0.00000E+00 |
| C22 | -9.02993E-05 | C44 | 0.00000E+00 | C66 | -8.80354E-07 |

LENS SYSTEM, IMAGING DEVICE, AND IMAGING SYSTEM

BACKGROUND

1. Technical Field

The present disclosure relates to a lens system, an imaging device, and an imaging system.

2. Related Art

WO 2003/010599 A discloses a method for capturing a panoramic image using an image sensor having an oblong shape. In WO 2003/010599 A, a circular image is converted into a quadrilateral image by using a toric lens as a fisheye objective lens. Thereby, in the image sensor having an oblong shape, a panoramic image can be captured by forming a quadrilateral image on a quadrilateral imaging element.

SUMMARY

The present disclosure provides a lens system, an imaging device, and an imaging system capable of generating, in forming an image on an imaging element, negative distortion relatively different between two directions crossing with each other.

A lens system according to the present disclosure is a lens system for forming an image of light incident from an object side on an imaging element arranged on an image surface side, the lens system includes: a plurality of lens elements including free-curved surface lenses; and a diaphragm arranged between the plurality of lens elements. The plurality of lens elements form a front group arranged on the object side of the diaphragm, and a rear group arranged on the image surface side of the diaphragm. A first lens element has an aspherical surface that is rotationally symmetrical, the first lens element being closest to the object side in the plurality of lens elements. The free-curved surface lenses each has a free-curved surface that is asymmetrical with respect to a first direction and a second direction, and are arranged in the front group and the rear group respectively, the first and second directions crossing with each other. A free-curved surface lens satisfying following conditional expression (1) is arranged on the rear group in the plurality of lens elements.

$$D \times (SV - SH)/IH > 0.08 \quad (1)$$

where,

IH: a height at which a ray with an angle of view of 30° forms an image on the image surface, in the first direction;

SH: a sag amount at height IH of the free-curved surface, in the first direction;

SV: a sag amount at height IH of the free-curved surface, in the second direction; and D: "1" in a case where the free-curved surface is on the object side of the free-curved surface lens, or "−1" in a case where the free-curved surface is on the image surface side of the free-curved surface lens.

An imaging device according to the present disclosure includes the lens system, and an imaging element to capture an image formed by the imaging optical system.

An imaging system according to the present disclosure includes the imaging device, and an image processor to perform image processing on the image captured by the imaging element of the imaging device.

According to the lens system, the imaging device, and the imaging system according to the present disclosure, negative distortion relatively different between the first and second directions can be generated in forming an image on the imaging element.

BRIEF DESCRIPTION OF THE DRAWINGS

FIG. 5 is a table showing surface data of the lens system of the numerical example 1;

FIG. 6 is a table showing various data of the lens system of the numerical example 1;

FIG. 7 is a table showing aspherical surface data of a second surface in the lens system of the numerical example 1;

FIG. 8 is a table showing free-curved surface data of a third surface in the lens system of the numerical example 1;

FIG. 9 is a table showing free-curved surface data of a fourth surface in the lens system of the numerical example 1;

FIG. 10 is a table showing free-curved surface data of a fifth surface in the lens system of the numerical example 1;

FIG. 11 is a table showing free-curved surface data of a sixth surface in the lens system of the numerical example 1;

FIG. 12 is a table showing aspherical surface data of a 15th surface in the lens system of the numerical example 1;

FIG. 13 is a table showing free-curved surface data of a 17th surface in the lens system of the numerical example 1;

FIG. 14 is a table showing free-curved surface data of an 18th surface in the lens system of the numerical example 1;

FIG. 15 is a table showing free-curved surface data of a 19th surface in the lens system of the numerical example 1;

FIG. 16 is a table showing free-curved surface data of a 20th surface in the lens system of the numerical example 1;

FIG. 18 is a table showing satisfaction of various conditions in the lens system of the first embodiment;

FIG. 21 is a table showing surface data of a lens system of a numerical example 2;

FIG. 22 is a table showing various data of the lens system of the numerical example 2;

FIG. 23 is a table showing aspherical surface data of a second surface in the lens system of the numerical example 2;

FIG. 24 is a table showing free-curved surface data of a third surface in the lens system of the numerical example 2;

FIG. 25 is a table showing free-curved surface data of a fourth surface in the lens system of the numerical example 2;

FIG. 26 is a table showing free-curved surface data of a fifth surface in the lens system of the numerical example 2;

FIG. 27 is a table showing free-curved surface data of a sixth surface in the lens system of the numerical example 2;

FIG. 28 is a table showing aspherical surface data of a 15th surface in the lens system of the numerical example 2;

FIG. 29 is a table showing free-curved surface data of a 17th surface in the lens system of the numerical example 2;

FIG. 30 is a table showing free-curved surface data of an 18th surface in the lens system of the numerical example 2;

FIG. 31 is a table showing free-curved surface data of a 19th surface in the lens system of the numerical example 2;

FIG. 32 is a table showing free-curved surface data of a 20th surface in the lens system of the numerical example 2;

FIG. 36 is a table showing surface data of a lens system of a numerical example 3;

FIG. 37 is a table showing various data of the lens system of the numerical example 3;

FIG. 38 is a table showing aspherical surface data of a second surface in the lens system of the numerical example 3;

FIG. 39 is a table showing free-curved surface data of a third surface in the lens system of the numerical example 3;

FIG. 40 is a table showing free-curved surface data of a fourth surface in the lens system of the numerical example 3;

FIG. 41 is a table showing aspherical surface data of a fifth surface in the lens system of the numerical example 3;

FIG. 42 is a table showing aspherical surface data of a 14th surface in the lens system of the numerical example 3;

FIG. 43 is a table showing free-curved surface data of a 15th surface in the lens system of the numerical example 3;

FIG. 44 is a table showing free-curved surface data of a 16th surface in the lens system of the numerical example 3;

FIG. 45 is a table showing free-curved surface data of a 17th surface in the lens system of the numerical example 3;

FIG. 46 is a table showing free-curved surface data of an 18th surface in the lens system of the numerical example 3;

DESCRIPTION OF EMBODIMENTS

Hereinafter, the embodiments will be described in detail with reference to the drawings as appropriate. However, more detailed description than necessary may be omitted. For example, detailed descriptions of already well-known matters or duplicate descriptions of substantially the same configurations may be omitted. This is to avoid unnecessary redundancy in the following description and to facilitate understanding by those skilled in the art.

It should be noted that the applicant provides the accompanying drawings and the following description for those skilled in the art to fully understand the present disclosure, and it is not intended to limit the subject matters described in the appended claims by them.

First Embodiment

A first embodiment of a lens system, an imaging device, and an imaging system according to the present disclosure will now be described with reference to the drawings.

1. Imaging System

Figure 1:
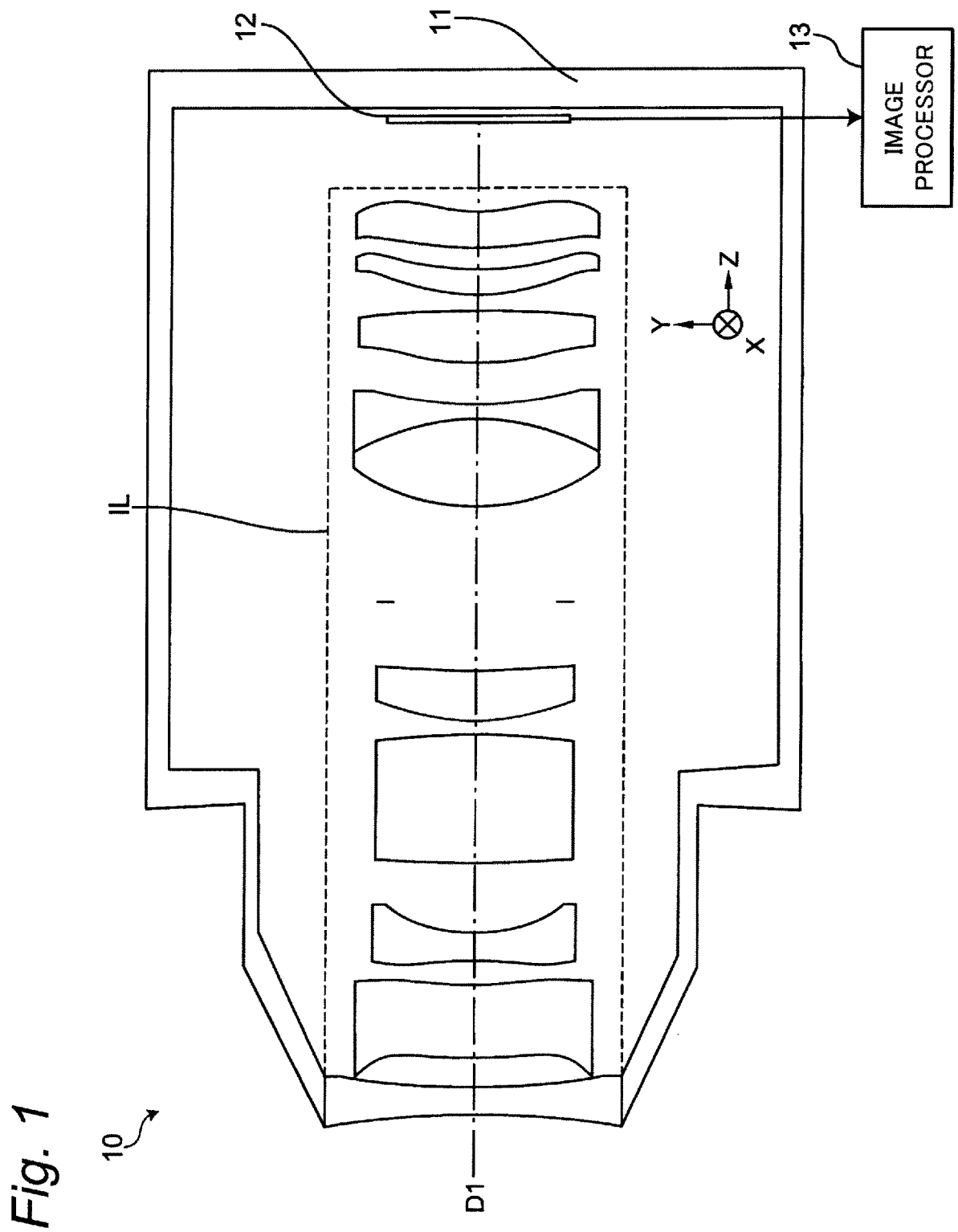
FIG. 1 is a diagram showing a configuration of an imaging system according to a first embodiment of the present disclosure.

The imaging system according to the present embodiment will be described with reference to FIG. 1. FIG. 1 is a diagram showing a configuration of imaging system 10 according to the present embodiment.

As shown in FIG. 1, imaging system 10 according to the present embodiment includes imaging device 11 and image processor 13, for example. Imaging device 11 includes lens system IL and imaging element 12. Imaging device 11 is a device that captures images of various objects as subjects, such as various kinds of cameras. Image processor 13 may be incorporated in a camera or the like. Hereinafter, a direction of optical axis D1 of lens system IL in imaging device 11 is defined as a Z-direction, a horizontal direction orthogonal to the Z-direction is defined as an X-direction, and a vertical direction orthogonal to the Z-direction and X-direction is defined as a Y-direction.

Lens system IL takes in light incident from an outside of imaging device 11, and forms an image of an image circle or the like by the taken-in light. Lens system IL includes a refractive optical system, for example. Details of lens system IL will be described later. Hereinafter, a +Z side of lens system IL is defined as an image surface side, whereas a −Z side is defined as an object side, as shown in FIG. 1.

Imaging element 12 is a CCD or CMOS image sensor, for example. Imaging element 12 has the imaging surface on which a plurality of pixels are two-dimensionally arranged at equal intervals. Imaging element 12 is arranged in imaging device 11 such that the imaging surface is located on the image surface of lens system IL. Imaging element 12 captures an image formed on the imaging surface via lens system IL, and generates an image signal indicating the captured image.

Image processor 13 performs predetermined image processing on the image captured by imaging device 11 based on the image signal from imaging element 12. For example, the image processing is gamma correction, distortion correction, or the like. Image processor 13 includes a CPU, an MPU, or the like that achieves various functions by executing a program stored in an internal memory, for example. Image processor 13 may include a dedicated hardware circuit designed to achieve a desired function. Image processor 13 may include a CPU, an MPU, a GPU, a DSP, an FPGA, an ASIC, or the like.

In imaging system 10 according to the present embodiment, the imaging surface of imaging element 12 is formed in a rectangular shape, for example. The imaging surface of imaging element 12 will be described with reference to FIG. 2.

Figure 2:
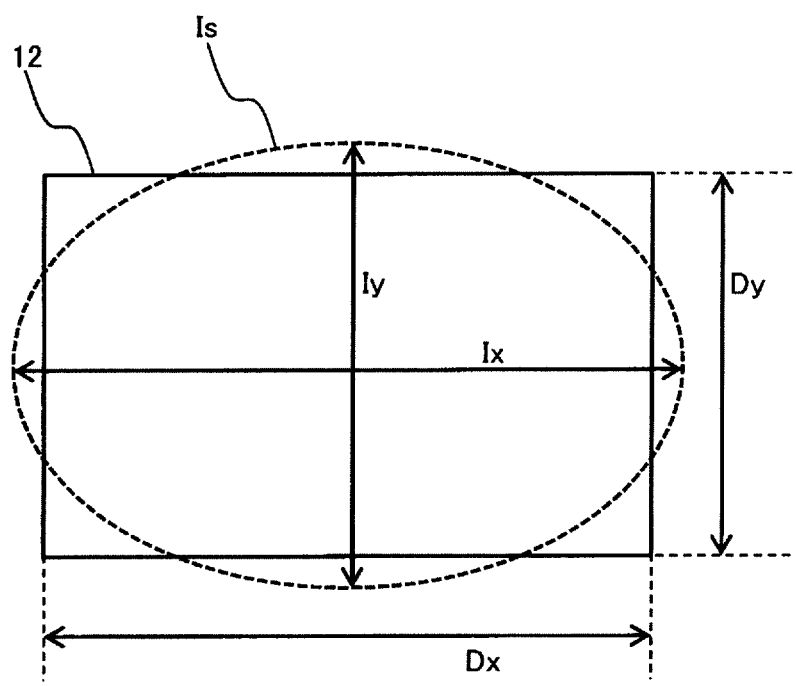
FIG. 2 is a diagram for explaining an imaging element in the imaging system.

FIG. 2 illustrates a case where the imaging surface of imaging element 12 has a rectangular shape. Imaging element 12 has long sides Dx and short sides Dy that define the imaging surface. In an example in FIG. 2, long side Dx is orthogonal to short side Dy and is longer than short side Dy. Imaging element 12 is arranged such that long side Dx is parallel to the X-direction and short side Dy is parallel to the Y-direction. Hereinafter, the X-direction may be referred to as a long side direction, and the Y-direction may be referred to as a short side direction.

FIG. 2 illustrates a positional relation between image circle Is formed by lens system IL and the imaging surface. Image circle Is of the present embodiment has a shape distorted from a circular shape to an ellipse or the like, and has major axis Ix and minor axis Iy. In the example in FIG. 2, major axis Ix is orthogonal to minor axis Iy and is longer than minor axis Iy. Lens system IL is arranged such that major axis Ix of image circle Is is parallel to the X-direction and minor axis Iy thereof is parallel to the Y-direction, corresponding to long side Dx and short side Dy of imaging element 12. In the present embodiment, the X-direction is an example of the first direction, and the Y-direction is an example of the second direction. Also, long side Dx is an example of the first side, and short side Dy is an example of the second side.

Image circle Is of lens system IL has a portion that is not included in a range of the imaging surface of imaging element 12, for example. In the example in FIG. 2, major axis Ix of image circle Is is longer than long side Dx of imaging element 12. In image circle Is, minor axis Iy is longer than short side Dy of imaging element 12. Imaging element 12 captures an image by image circle Is within the range of the imaging surface.

In imaging system 10 as described above, lens system IL according to the present embodiment reduces an angle of view in the short side direction (i.e., the Y-direction), thereby achieving high resolution of the captured image in the short side direction. Hereinafter, details of lens system IL of the present embodiment will be described.

2. Lens System

As an example in which lens system IL according to the present embodiment is specifically implemented, each of first to third examples of lens system IL will be described below.

2-1. First Example

Lens system IL1 according to a first example will be described with reference to FIGS. 3 to 17.

Figure 3:
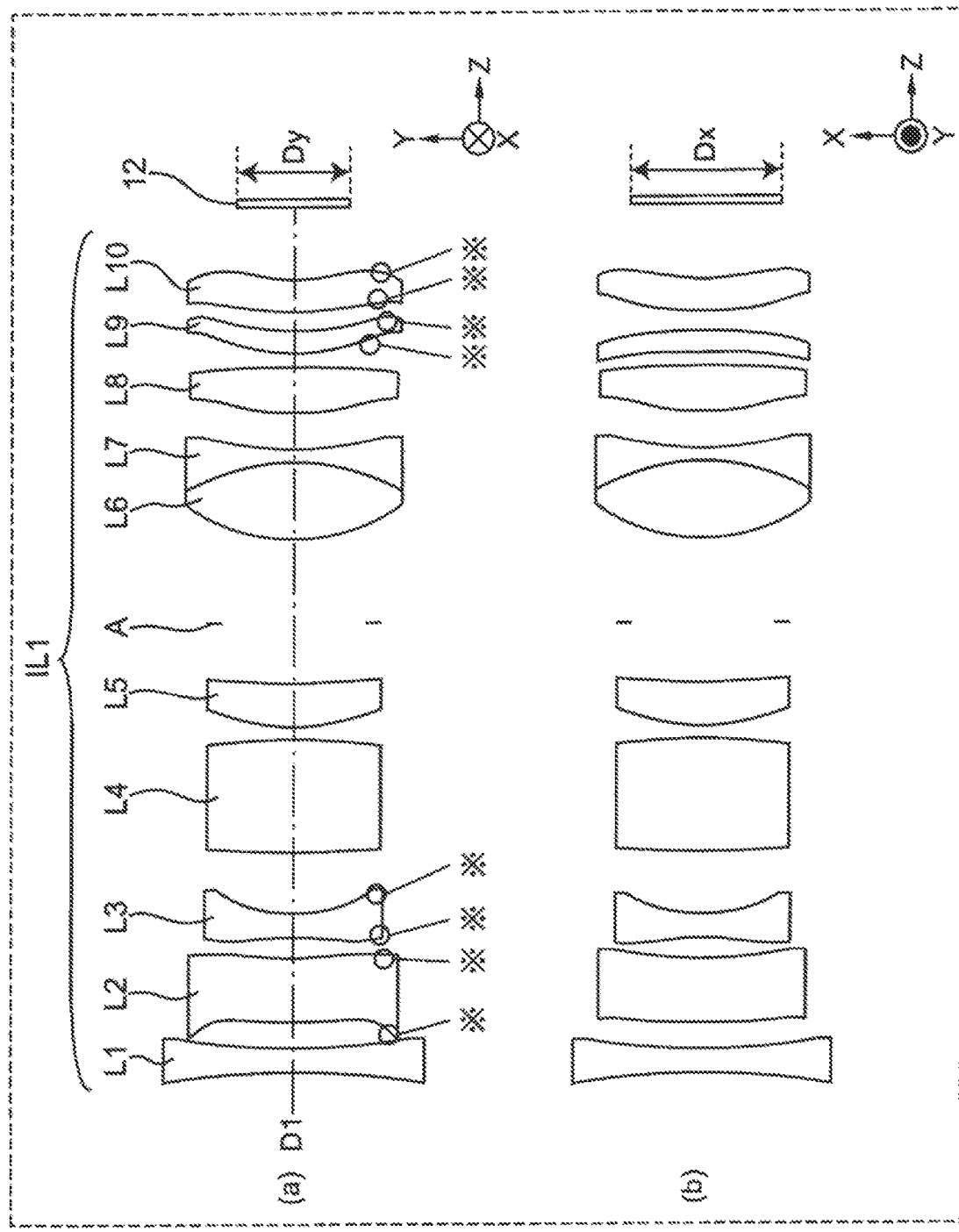
FIG. 3 is a lens layout diagram showing a configuration of a lens system according to a first example.

FIG. 3 is a lens layout diagram showing a configuration of lens system IL1 according to the first example. Each of following lens layout diagrams shows an arrangement of various lenses when lens system IL1 is in an infinity focusing state, for example. A part (a) of FIG. 3 shows a lens layout diagram in a YZ cross-section of lens system IL1 of the present example. A part (b) of FIG. 3 shows a lens layout diagram in an XZ cross-section of lens system IL1. Each of the YZ cross-section and the XZ cross-section is a virtual cross-section along optical axis D1 of lens system IL1.

In the part (a) of FIG. 3, a curved surface marked with a symbol "*" indicates a free-curved surface. The free-curved surface is a rotationally asymmetric curved surface with respect to optical axis D1. For example, the free-curved surface marked with "*" is an XY polynomial surface described later (see mathematical expression (E2)). It should be noted that various symbols are omitted in the part (b) of FIG. 3.

Lens system IL according to the present embodiment has multiple free-curved surfaces that are asymmetric between the X-direction and the Y-direction as shown in the parts (a), (b) of FIG. 3, for example. Hereinafter, a lens element having a free-curved surface on at least one of the object side and the image surface side is referred to as a free-curved surface lens.

Lens system IL1 of the first example includes first to tenth lens elements L1 to L10 and diaphragm A. In lens system IL1, first to tenth lens elements L1 to L10 are arranged in order from the object side to the image surface side along optical axis D1, as shown in the part (a) of FIG. 3. Diaphragm A is an aperture diaphragm.

In lens system IL1 of the present example, first lens element L1 closest to the object side has a biconcave shape. First lens element L1 is an aspherical lens having a rotationally symmetric aspherical surface on the image surface side, for example. Second lens element L2 is a free-curved surface lens having free-curved surfaces on both sides each facing the object side and the image surface side such that power (i.e., refractive power) is negative. Third lens element L3 is a free-curved surface lens having free-curved surfaces on both sides so as to have negative power.

Fourth lens element L4 is a spherical lens having a biconvex shape, for example. Fifth lens element L5 is a spherical lens having a positive meniscus shape, for example. Fifth lens element L5 is arranged such that a convex surface is directed toward the object side. Diaphragm A is arranged between fifth lens element L5 and sixth lens element L6.

Sixth lens element L6 is a spherical lens having a biconvex shape, for example. Sixth lens element L6 and seventh lens element L7 are joined together, for example. Seventh lens element L7 is a spherical lens having a biconcave shape, for example. Eighth lens element L8 is an aspherical lens having a rotationally symmetric aspherical surface on the object side and has a biconvex shape, for example. Ninth lens element L9 is a free-curved surface lens having free-curved surfaces on both sides, for example. Tenth lens element L10 is a free-curved surface lens having free curved surfaces on both sides, and is provided closest to the image surface side in lens system IL1 of the present example, for example.

In lens system IL1 configured as described above, first to fifth lens elements L1 to L5 form a front group, and sixth to tenth lens elements L6 to L10 form a rear group. The front group is a lens group arranged on the object side of diaphragm A. The rear group is a lens group arranged on the image surface side of diaphragm A.

In lens system IL1 of the present example, the front group includes two free-curved surface lenses as second and third lens elements L2, L3. The rear group includes two free-curved surface lenses as ninth and tenth lens elements L9, L10. With two or more free-curved surface lenses in each group, an incident ray of light is bent four or more times, so that aberration correction for obtaining rotationally asymmetric characteristics can be performed appropriately. Further, one or more free-curved surfaces are provided in each of the groups in front of and behind diaphragm A. Hence, the aberration caused in the front group can be corrected in the rear group.

According to lens system IL1 described above, an image in which a vicinity of a center is enlarged more than a peripheral area can be obtained by generating, with the free-curved surface lenses, negative distortion asymmetric with respect to optical axis D1 while taking in an angle of view on the image surface. The effects of such lens system IL1 will be described with reference to FIG. 4.

Figure 4:
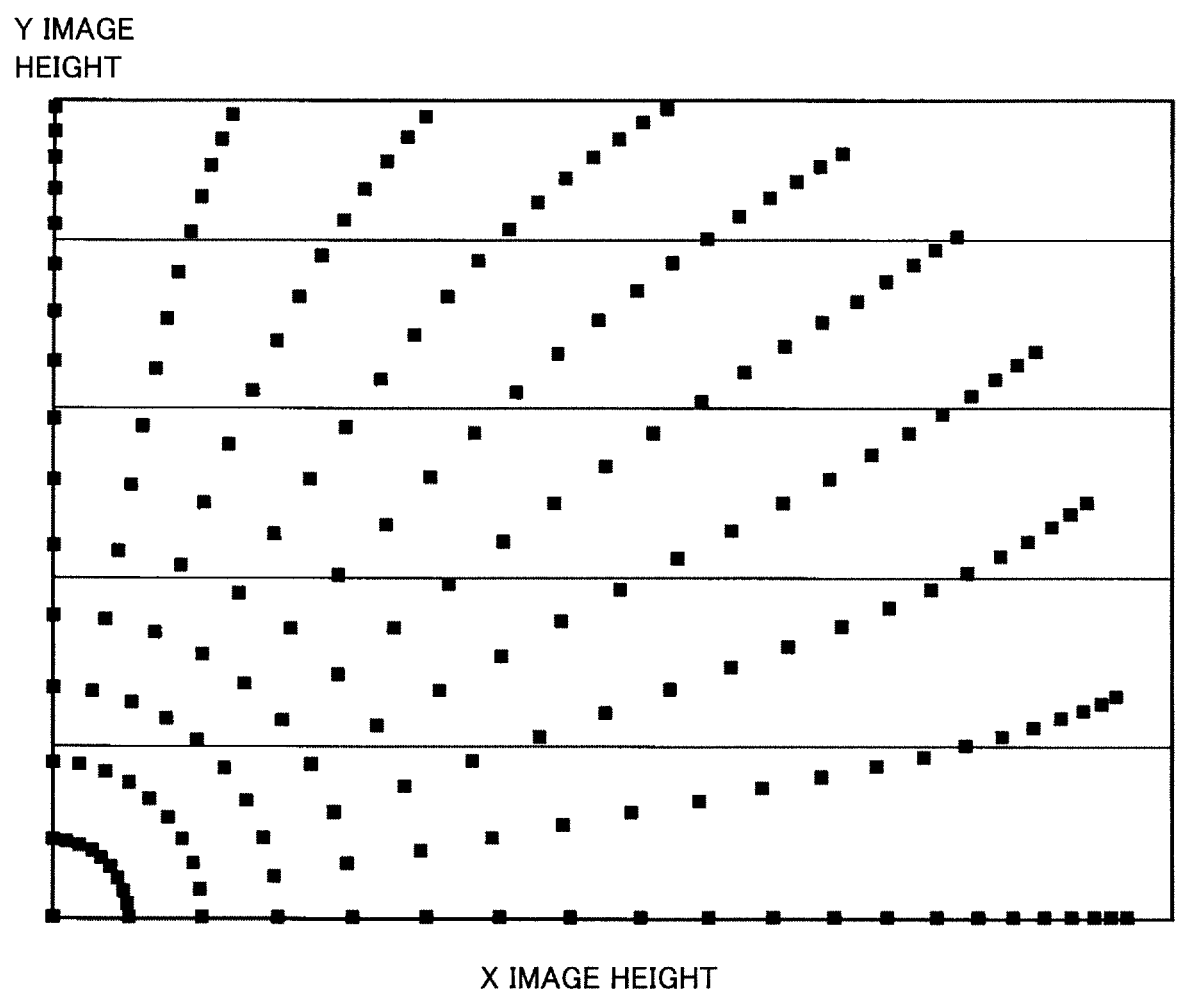
FIG. 4 is a scatter plot showing a relationship between an angle of view and an image point in a lens system of a numerical example 1.

FIG. 4 is a scatter plot showing a relationship between an angle of view and image point P1 in lens system IL1 of the present example. In FIG. 4, image point P1 at which incident light forms an image on the image surface is plotted for each predetermined angular width in an entire angle of view of lens system IL1. The angular width is set to 2.5°. In this case, a rotational phase on an XY plane is set to each 10°. Lens system IL1 is set to be in an infinity focusing state.

The plots in FIG. 4 are based on a numerical example 1 in which lens system IL1 of the first example is numerically implemented. The numerical example 1 of lens system IL1 will be described later. In FIG. 4, image points P1 in a first quadrant are illustrated on the XY plane of the image surface whose origin is a position of optical axis D1. Since lens system IL1 of the present example has line symmetry with respect to an X-axis and a Y-axis, the same applies to second to fourth quadrants as in FIG. 4.

According to FIG. 4, in lens system IL1 of the present example, a distance between image points P1 becomes larger as it gets closer to the origin in both the X-direction and the Y-direction. Thereby, an image, in which an area within a predetermined range in the vicinity of the center is relatively enlarged more than an end portion, can be formed on the image surface.

From the relative perspective to central enlargement of an image as described above, more of the pixels on the imaging surface of imaging element 12 are allocated (i.e., more densely) to the enlarged area near the center than to other areas. Therefore, imaging device 10 of the present embodiment can capture an image of an area closer to the center with higher resolution. According to FIG. 4, especially in the Y-direction, a change in the distance between image points P1 is remarkable. That is, negative distortion is generated more remarkably in the Y-direction than in the X-direction. Thereby, imaging device 10 according to the present embodiment can capture an image of the vicinity of the center in the vertical direction with high resolution, as well as a wide range in the vertical direction is able to be captured.

By providing free-curved surface lenses each having negative power in the front group, such as second and third lens elements L2, L3 in lens system IL1 of the present example, it can be facilitated to form asymmetric distortion in the peripheral area of the imaging surface of imaging element 12, for taking in an angle of view with the center being relatively enlarged.

For example, it is considered that if anamorphic aspherical surfaces are used instead of all the free-curved surfaces in lens system IL1 described above, performance may fall short in a diagonal direction between the X-axis and the Y-axis. In contrast to this, by using the free-curved surfaces, lens system IL of the present embodiment can make the distance between image points P1 larger as it is closer to the center while ensuring an angle of view even in the diagonal direction, as shown in FIG. 4. Thus, it can obtain high resolution.

The numerical example 1 corresponding to lens system IL1 of the first example as described above will be described with reference to FIGS. 5 to 17.

FIG. 5 is a table showing surface data of lens system IL1 in the numerical example 1. For each of surfaces s1 to s22 arranged in order from the object side in lens system IL1, the surface data in FIG. 5 show a type of the respective surface, a radius of curvature r and a surface spacing d in mm, and a refractive index nd and an Abbe's number vd of the lens element with respect to a d-line. The types of the surfaces include a spherical surface, an aspherical surface, and an XY polynomial surface as the free-curved surface.

FIG. 6 is a table showing various data of lens system IL1 in the numerical example 1. The various data in FIG. 6 show an F number, a vertical half angle of view, a horizontal half angle of view, a horizontal image height at the horizontal half angle of view, a horizontal image height at the vertical half angle of view, and an optical total length, in the present numerical example. A unit of each of the various image heights and the optical total length is "mm", and a unit of each half angle of view is "°".

FIG. 7 is a table showing aspherical surface data of second surface s2 in lens system IL1 of the numerical example 1. The aspherical surface data in FIG. 7 show, for a surface on the image surface side of first lens element L1, coefficients of a following mathematical expression (E1) that defines the shape of the aspherical surface, respectively.

[Mathematical expression 1]

$$Z = \frac{h^2/r}{1+\sqrt{1-(1+\kappa)(h/r)^2}} + \sum A_n h^n \quad (E1)$$

In the above mathematical expression (E1), h is a height in a radial direction, K is a conic constant, and An is an aspherical coefficient of degree n. In a second term on a right side of the above mathematical expression (E1), n is an even number of e.g. 4 or more and 20 or less, and a sum for each n is calculated. According to the above mathematical expression (E1), a sag amount z at height h in the radial direction on a target surface is defined as rotationally symmetric.

FIG. 8 is a table showing free-curved surface data of third surface s3 in lens system IL1 of the numerical example 1. The free-curved surface data in FIG. 8 show, for a surface on the object side of second lens element L2, coefficients of an XY polynomial that defines the XY polynomial surface as the free-curved surface. The XY polynomial is expressed by a following mathematical expression (E2).

[Mathematical expression 2]

$$z = \frac{cr^2}{1+\sqrt{1-(1+K)c^2r^2}} + \sum_{j=2}^{66} c_j x^p y^q \quad (E2)$$

$$j = \frac{(p+q)^2 + p + 3q}{2} + 1$$

In the above mathematical expression (E2), c is a peak curvature, K is a conic constant, and $c_j$ is a coefficient. In a second term on a right side of the above mathematical expression (E2), j is an integer of e.g. 2 or more and 66 or less, and a sum for each j is calculated. According to the above mathematical expression (E2), sag amount z at a position of (x, y) coordinates on a target surface is defined more freely than the regularity of the anamorphic aspherical surface.

FIG. 9 is a table showing free-curved surface data of fourth surface s4 in lens system IL1 of the numerical example 1. The free-curved surface data in FIG. 9 show, for a surface on the image surface side of second lens element L2, the coefficients of the mathematical expression (E2), similarly to FIG. 9.

FIGS. 10, 11 are tables showing free-curved surface data of fifth and sixth surfaces s5, s6 in lens system IL1 of the numerical example 1, respectively. The free-curved surface data in FIGS. 10, 11 respectively show, for each surface on the object side and the image surface side of third lens element L3, the coefficients of the mathematical expression (E2), similarly to FIG. 9.

FIG. 12 is a table showing aspherical surface data of 15th surface s15 in lens system IL1 of the numerical example 1.

The aspherical surface data in FIG. 12 show, for a surface on the objective side of eighth lens element L8, the coefficients of the mathematical expression (E1), similarly to FIG. 7.

FIGS. 13, 14 are tables showing free-curved surface data of 17th, 18th surfaces s17, s18 in lens system IL1 of the numerical example 1, respectively. FIGS. 15, 16 are tables showing free-curved surface data of 19th, 20th surfaces s19, s20 in lens system IL1 of the numerical example 1, respectively. The free-curved surface data in FIGS. 13 to 16 respectively show, for each surface on the object side and the image surface side of each of ninth and tenth lens elements L9, L10, the coefficients of the mathematical expression (E2), similarly to FIG. 8.

Figure 17:
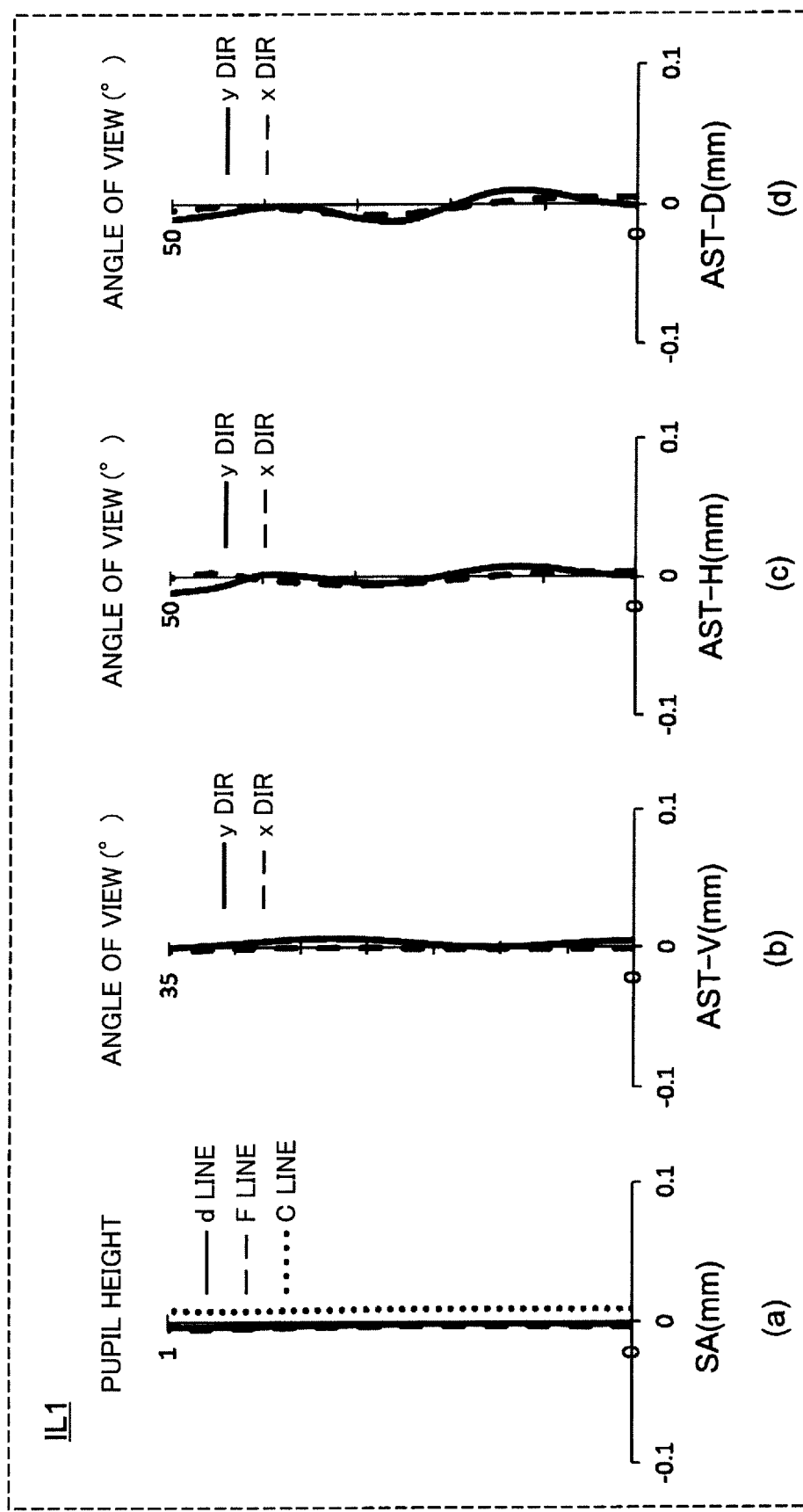
FIG. 17 is an aberration diagram showing various aberrations in the lens system of the numerical example 1.

FIG. 17 is an aberration diagram showing various aberrations of lens system IL1 in the present example. Following aberration diagrams illustrates various longitudinal aberrations in the infinity focusing state. A part (a) of FIG. 17 shows spherical aberration "SA" in lens system ILL Parts (b), (c), (d) of FIG. 17 show astigmatism "AST-V" in the Y-direction, astigmatism "AST-H" in the X-direction, and astigmatism "AST-D" in the diagonal direction, respectively.

Each of horizontal axes of the parts (a) to (d) of FIG. 17 is expressed in mm. A vertical axis of the part (a) of FIG. 17 is based on a pupil height. The part (a) of FIG. 17 shows characteristic curves, with respect to the d-line, an F-line, and a C-line, of the spherical aberration. Each of vertical axes of the parts (b) to (d) of FIG. 17 is based on the half angles of view. The parts (b) to (d) of FIG. 17 show characteristic curves of the astigmatisms with respect to the XZ cross-section or the YZ along the X-direction or the Y-direction and optical axis D1, respectively.

The present embodiment uses only even-number terms of x and y on each free-curved surface, as shown in FIGS. 8 to 11 and 13 to 16, for example. Therefore, the aberration "AST-D" in the diagonal direction and the like are the same in any one of the first to fourth quadrants.

2-2. VARIOUS CONDITIONS

Various conditions satisfied by lens system IL according to the present embodiment will be described by using the numerical example 1 of lens system IL1 described above and with reference to FIGS. 18, 19.

FIG. 18 is a table showing satisfaction of the various conditions in lens system IL of the present embodiment. The table shown in FIG. 18 shows that lens system IL of the present embodiment satisfies following conditions (1) to (6) in each of the first to numerical example 3s. In FIG. 18, "R1" denoted next to lens elements L8 to L10 indicates that it is the surface facing the object side (i.e., −Z side), and "R2" indicates that it is the surface facing the image surface side (i.e., +Z side). For example, "L8R1" indicates that it is the surface, on the −Z side, of eighth lens element L8.

Condition (1) indicates that the free-curved surface lens in the rear group located on the +Z side of diaphragm A in lens system IL has a free-curved surface satisfying following conditional expression (1).

$$D \times (SV - SH)/IH > 0.08 \tag{1}$$

In expression (1) described above, IH is a height at which a ray of light having an angle of view of 30° in the horizontal direction (i.e., the X-direction) forms an image on the image surface. SH is a sag amount, in the horizontal direction, of a place at height IH of a target free-curved surface. SV is a sag amount, in the vertical direction (i.e., the Y-direction), of the place at height IH of the same free-curved surface. D is a sign constant, which is "1" in the case where the free-curved surface is the surface on the object side of a lens element, or "−1" in the case where the free-curved surface is the surface on the image surface side of a lens element.

On a left side of expression (1) described above, a difference (PV−PH) between the following PV and PH is normalized by reference height IH for a specific free-curved surface in the rear group of the lens system IL.

$$PV = D \times SV$$

$$PH = D \times SH$$

where, PV indicates a power tendency in the YZ cross-section of a lens element according to sag amount SV, in the vertical direction, of a target free-curved surface. PH indicates a power tendency in the XZ cross-section according to sag amount SH, in the horizontal direction, of the same surface. PV, PH will be described with reference to FIG. 19.

Figure 19:
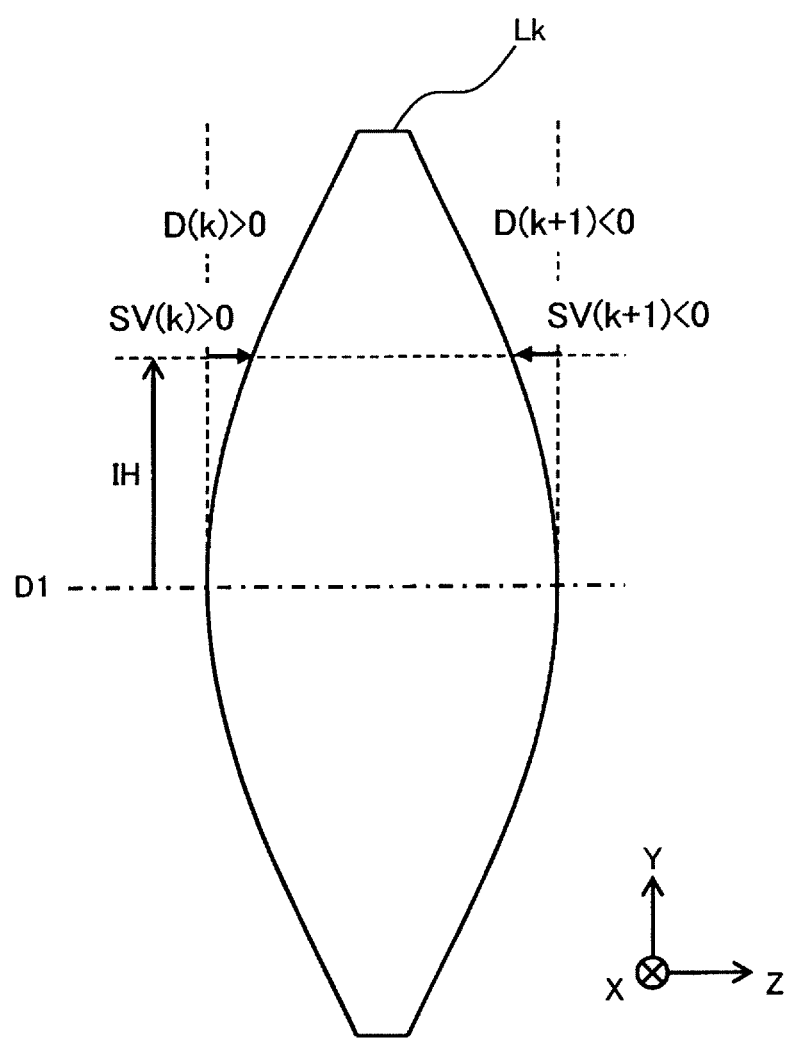
FIG. 19 is a diagram for explaining various conditions in the lens system.

FIG. 19 illustrates the YZ cross-section of lens element Lk having a k-th free-curved surface on the −Z side and a (k+1)-th free-curved surface on the +Z side. FIG. 19 illustrates a case where lens element Lk has a biconvex shape as a whole and produces positive power on both the surfaces.

In this case, sag amount SV(k) of the −Z side surface of lens element Lk is positive as shown in FIG. 19. Additionally, sign constant D(k) is "1", and hence PV(k)>0. Sag amount SV(k+1) of the +Z side surface of lens element Lk is negative as shown in FIG. 19. Together with this, sign constant D(k+1) is inverted from D(k) to "−1." Therefore, PV(k+1)>0.

As described above, positive or negative of PV corresponds to the positive or negative of the power in the YZ cross-section regardless of whether the corresponding free-curved surface is on the +Z side or on the −Z side of lens element Lk. The same applies to positive or negative of PH in the XZ cross-section.

Here, for a free-curved surface, a difference occurs between PV and PH according to a difference between sag amount SV in the vertical direction and sag amount SH in the horizontal direction. When the difference (PV−PH) is positive, the corresponding free-curved surface has a tendency in which power is more positively increased in the YZ cross-section than in the XZ cross-section of lens element Lk, i.e., more in the vertical direction than in the horizontal direction.

In view of the above, the free-curved surface satisfying conditional expression (1) more positively increases power in the vertical direction than in the horizontal direction, in the rear group of lens system IL. The positive power in the rear group of lens system IL has a negative effect on distortion aberration. Therefore, lens system IL can obtain the distortion which is negative in the vertical direction rather than in the horizontal direction, according to condition (1).

FIG. 18 shows calculated values for the left side of conditional expression (1). In lens system IL1 in FIG. 3, the free-curved surface lenses in the rear group are ninth and tenth lens elements L9, L10. Regarding condition (1), as shown in FIG. 18, the calculated value "0.176" for the free-curved surface on the object side of ninth lens element L9 of the first example is above a lower limit "0.08" shown on the right side of expression (1) described above. Thereby, lens system IL1 of the first example satisfies condition (1).

Below the lower limit of conditional expression (1), the difference between the sag amounts so small that it is difficult to control distortion in the vertical, diagonal, and horizontal directions. Therefore, it becomes difficult to obtain the effect of making the distortion to be negative in the vertical direction rather than in the horizontal direction. It is also necessary to increase a number of lenses, which causes a cost increase.

In condition (1), reference height IH of each of sag amounts SV, SH is set according to a desired height at which the effect of distortion is desired to be obtained on the image surface, for example. In particular, a ray having a higher position is more likely to affect distortion. That is, controllability of distortion is likely to be affected by the height of a ray. From this viewpoint, in condition (1), the effect on the performance of forming an image is defined at reference height IH with normalization by height IH. According to condition (1), more negative distortion can be obtained in the peripheral area of the image surface.

Condition (2) indicates that a free-curved surface lens in the rear group of lens system IL has a free-curved surface satisfying following conditional expression (2), for example. The free-curved surface lens satisfying condition (2) is not limited to the rear group, and may be arranged in the front group of lens system IL.

$$D \times (SVb - SHb)/IHb < -0.01 \qquad (2)$$

In expression (2) described above, IHb is a height at which a ray of light having an angle of view of 15° in the horizontal direction forms an image on the image surface. SHb is a sag amount, in the horizontal direction, at height IHb of a target free-curved surface. SVb is a sag amount, in the vertical direction, at height IHb of the free-curved surface. Sign constant D is "1" or "−1" as described above. Height IHb in condition (2) is lower than height IH in condition (1).

Condition (2) is a condition for suppressing an adverse reaction for condition (1). According to condition (1), it may cause not only an action of making distortion negative in the vertical direction rather than in the horizontal direction, but also an adverse reaction of negative curvature of field and astigmatism. In contrast to this, according to a free-curved surface satisfying condition (2), the above adverse reaction can be suppressed, with the power in the peripheral area of a lens being more negatively increased in the vertical direction than in the horizontal direction. FIG. 18 shows calculated values for the left side of conditional expression (2).

Above an upper limit of conditional expression (2), the difference between the sag amounts is so small that it may difficult to control, in each of the vertical, diagonal, and horizontal directions, astigmatism and curvature of field due to condition (1). It may also necessary to increase a number of lenses, which causes a cost increase. In contrast to this, as shown in FIG. 18, the calculated values for the surfaces on the +Z side of ninth and tenth lens elements L9, L10 in lens system IL1 of the first example are respectively below the upper limit of conditional expression (2), for example. Thereby, lens system IL1 of the first example satisfies condition (2), so that curvature of field and astigmatism can be appropriately controlled.

Condition (3) is defined by following conditional expression (3).

$$OAL/SD < 7.5 \qquad (3)$$

where, OAL is an optical total length of lens system IL. SD is a diameter of diaphragm A. FIG. 18 shows calculated values for the left side of conditional expression (3).

Above an upper limit of conditional expression (3), the optical total length is so large that is leads to upsizing of lens system IL. Alternatively, an F value is so large that it leads to a dark lens system. In contrast to this, according to the calculation result shown in FIG. 18, lens system IL1 of the first example satisfies condition (3), for example. Thereby, lens system IL1 can be reduced in size while ensuring its brightness.

Condition (4) is defined by following conditional expression (4).

$$nd1 > 1.6 \qquad (4)$$

where, nd1 is a refractive index of first lens element L1 with respect to the d-line, that is, a refractive index of the lens element closest to the −Z side in lens system IL. FIG. 18 shows such refractive indices of first lens element L1 of each of the first to third examples.

Condition (4) is a condition for increasing the refractive index of first lens element L1 such that a ray incident from the outside can be greatly bent. Below a lower limit of conditional expression (4), it is difficult to obtain the effect of enlarging the vicinity of the center while an angle of view is being widened, such as a difficulty in taking in light from a wide range in first lens element L1. Alternatively, it is necessary to increase the number of lenses, which causes a cost increase. In contrast to this, according to the calculation result shown in FIG. 18, lens system IL1 of the first example satisfies condition (4), for example. First lens element L1 is made of a glass material, for example.

Condition (5) is defined by following conditional expression (5).

$$ndf > 1.5 \qquad (5)$$

where, ndf is a refractive index of a free-curved surface lens with respect to the d-line. The refractive indices of the respective free-curved surface lenses of lens system IL are shown in FIG. 18.

Below a lower limit of conditional expression (5), it is difficult to obtain the above-described effects. Alternatively, it is necessary to increase the number of the lenses, which causes a cost increase. Additionally, it is difficult to properly control the spherical aberration and coma aberration while enlarging the center and taking in a vertical angle of view. In contrast to this, in lens system IL1 of the first example, the refractive indices of lens elements L2, L3, L9, L10 are above the lower limit of conditional expression (5) as shown in FIG. 18, for example. According to conditional expression (5), a ray can be easily controlled in a rotationally asymmetric manner by using free-curved surface lenses each having a high refractive index in lens system IL.

Condition (6) is defined by following conditional expression (6).

$$40 < vf < 60 \qquad (6)$$

where, vf is an Abbe's number of a free-curved surface lens. FIG. 18 shows the Abbe's number of each of the free-curved surface lenses in lens system IL.

Above an upper limit of conditional expression (6), or below a lower limit thereof, chromatic aberration severely changes in response to a temperature change, so that it is difficult to control the chromatic aberration properly. In contrast to this, in lens system IL1 of the first example, the Abbe's numbers of lens elements L2, L3, L9, L10 satisfy condition (6) as shown in FIG. 18, for example. According to condition (6), chromatic aberration can be easily controlled in lens system IL by setting the Abbe's number of a free-curved surface lens to an appropriate range.

Lens system IL according to the present embodiment can be implemented in various forms without being limited to lens system IL1 of the first example described above. Hereinafter, second and third examples of lens system IL will be described.

2-3. Second Example

Lens system IL2 of a second example will be described with reference to FIGS. 20 to 34.

Figure 20:
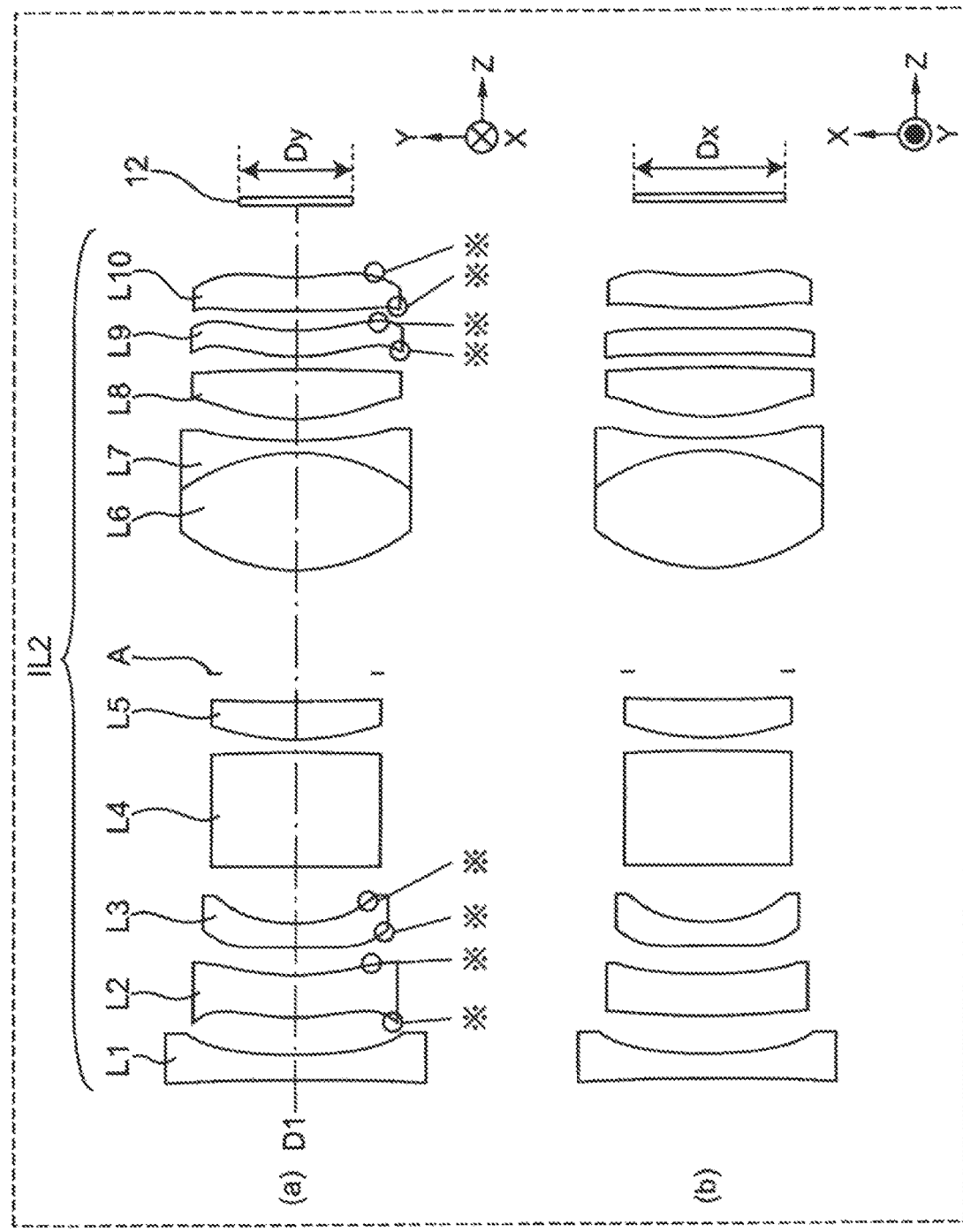
FIG. 20 is a lens layout diagram showing a configuration of a lens system according to a second example.
Figure 33:
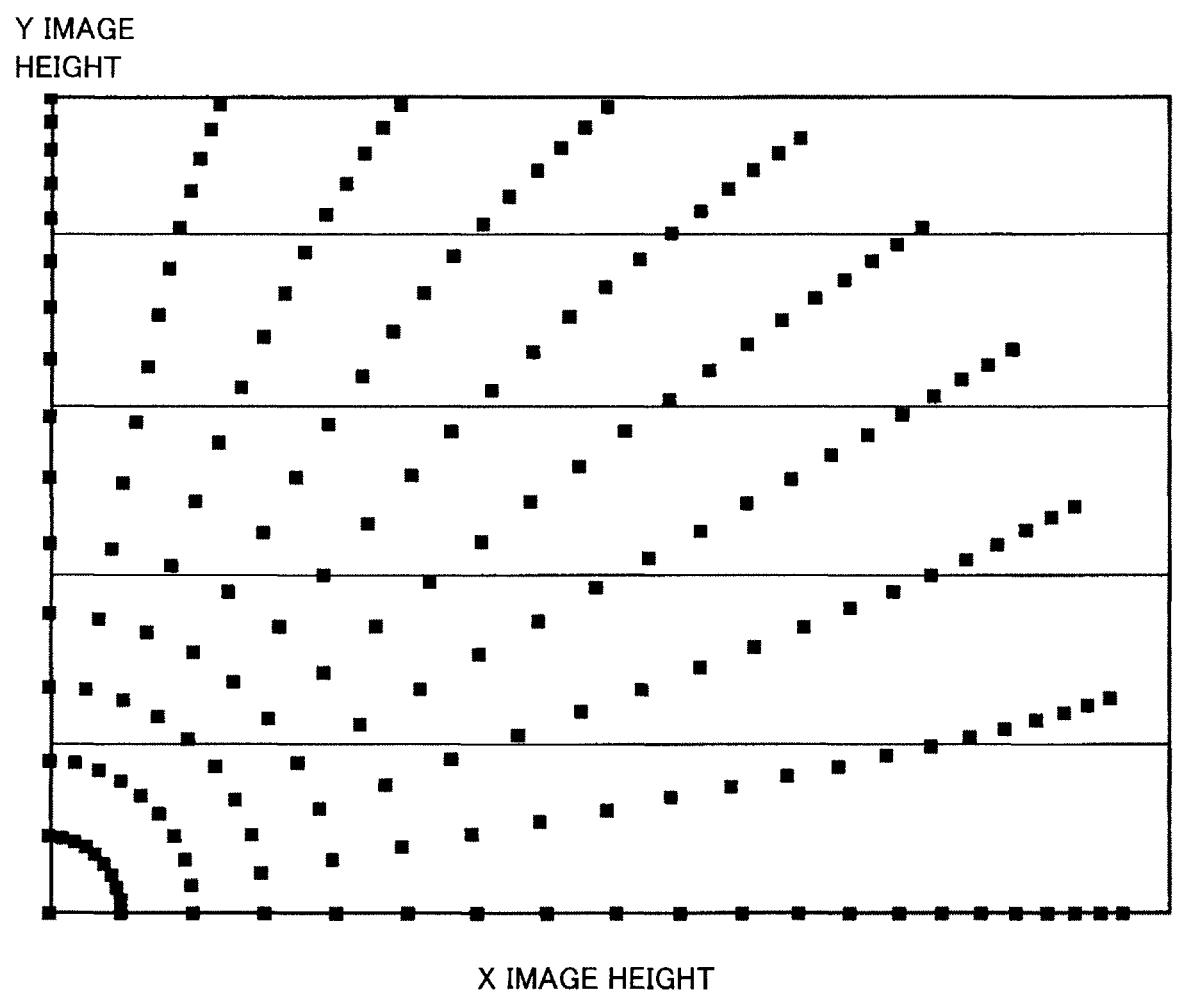
FIG. 33 is a scatter plot showing a relationship between an angle of view and an image point in the lens system of the numerical example 2.

FIG. 20 shows a configuration of lens system IL2 according to the second example. Parts (a), (b) of FIG. 20 show lens layout diagrams of lens system IL2, similarly to the parts (a), (b) of FIG. 3, respectively.

Lens system IL2 of the second example has the same configuration as that of the first example, except that shapes of various lens elements L1 to L10 and the like are changed. Free-curved surface lenses in lens system IL2 of the present example includes second and third lens elements L2, L3 in the front group and ninth and tenth lens elements L9, L10 in the rear group, similarly to the first example. A numerical example corresponding to lens system IL2 of the second example is shown in FIGS. 21 to 32.

FIG. 21 is a table showing surface data of lens system IL2 in a numerical example 2. FIG. 22 is a table showing various data of lens system IL2 in the present example. FIGS. 21, 22 show respective data, similarly to FIGS. 5, 6 of the numerical example 1, respectively.

FIG. 23 is a table showing aspherical surface data of second surface s2 in lens system IL2 of the present example. The aspherical surface data in FIG. 23 indicate, for a surface on the image surface side of first lens element L1, the coefficients of the mathematical expression (E1), similarly to the numerical example 1.

FIGS. 24 to 27 are tables showing free-curved surface data of third to sixth surfaces s3 to s6 in lens system IL2 of the present example, respectively. The free-curved surface data in FIGS. 24 to 27 indicate, for both the respective surfaces of second and third lens elements L2, L3, the coefficients of the mathematical expression (E2), similarly to the numerical example 1.

FIG. 28 shows aspherical surface data of 15th surface s15 in lens system IL2 of the present example, similarly to FIG. 23. FIGS. 29 to 32 respectively show free-curved surface data of 17th to 20th surfaces s17 to s20 in lens system IL2, similarly to FIG. 24 or the like.

Figure 34:
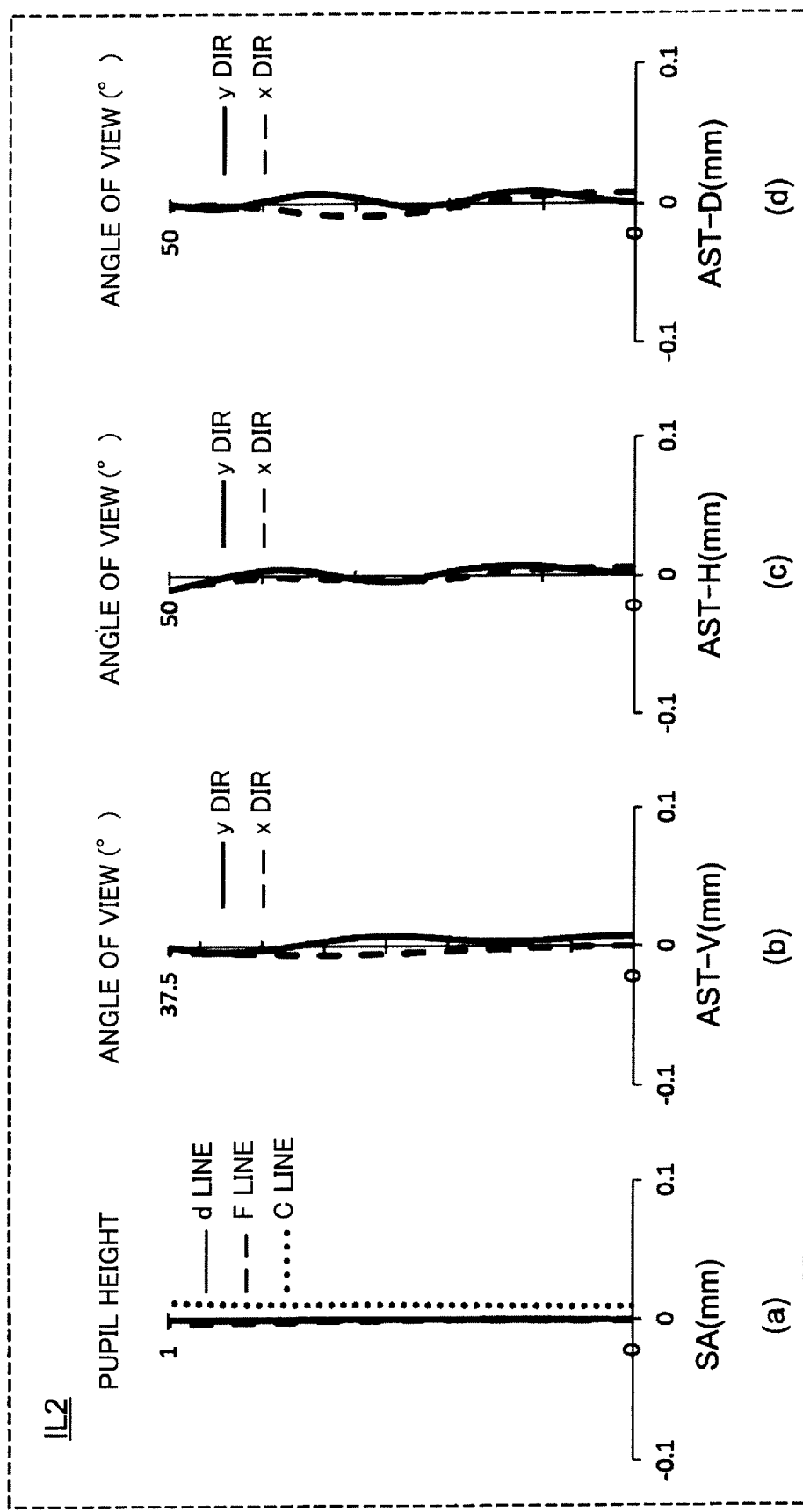
FIG. 34 is an aberration diagram showing various aberrations of the lens system of the numerical example 2.

Based on the numerical example 2 described above, FIG. 33 shows a relationship between an angle of view and image point P2 in lens system IL2 of the present example. FIG. 34 shows various aberrations of lens system IL2 in the present example. Parts (a), (b), (c), (d) of FIG. 34 respectively show aberration diagrams of lens system IL2 in the present example, similarly to the parts (a) to (d) of FIG. 17. As shown in FIG. 18, lens system IL2 of the present example satisfies respective conditions (1) to (6) described above. Lens system IL2 of the present example can also obtain negative distortion in the Y-direction rather than in the X-direction, similarly to the first example.

2-4. Third Example

In a third example, an example of lens system IL, in which one free-curved surface lens is provided in the front group, will be described. Lens system IL3 of the third example will be described with reference to FIGS. 35 to 48.

Figure 35:
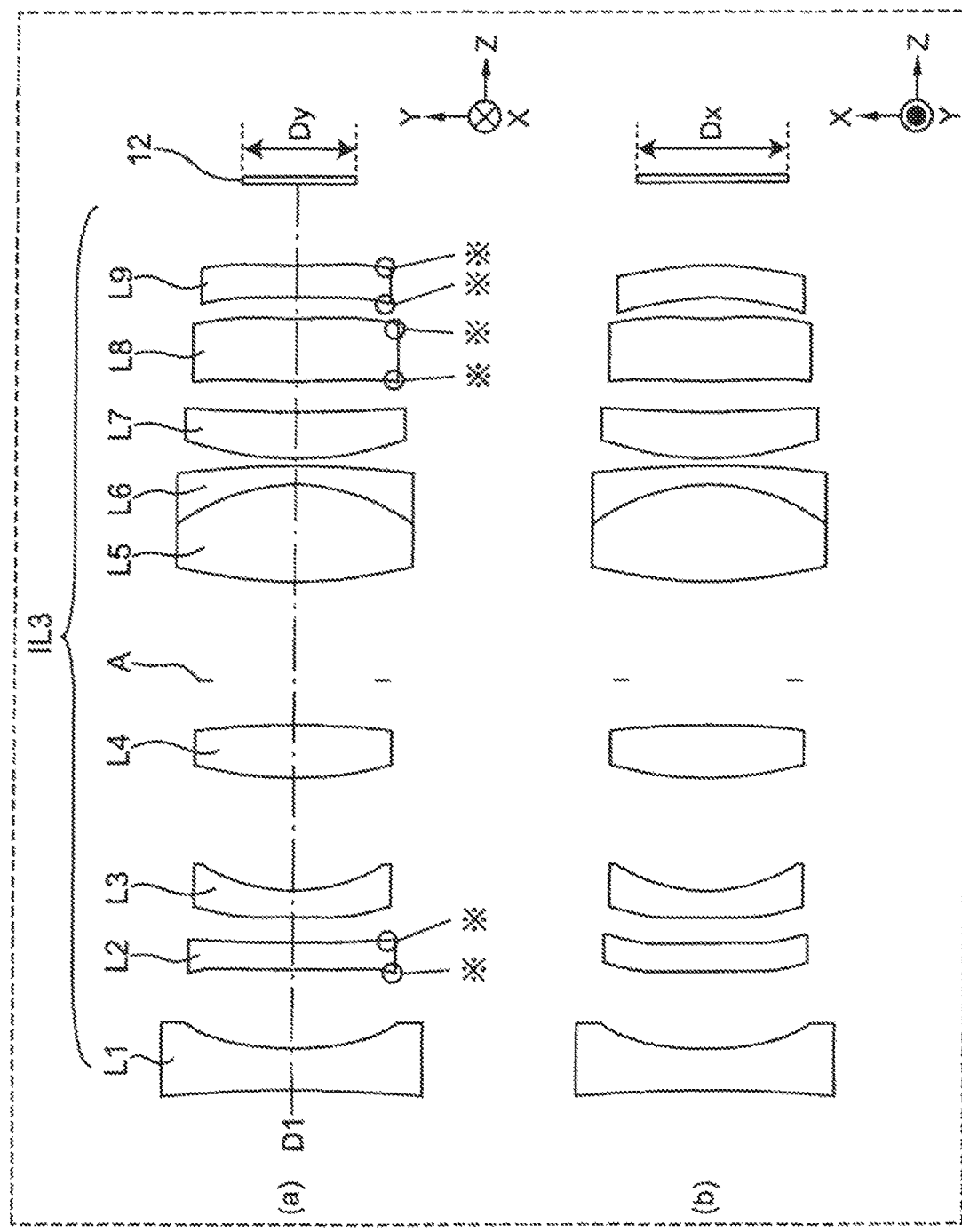
FIG. 35 is a lens layout diagram showing a configuration of a lens system according to a third example.

FIG. 35 shows a configuration of lens system IL3 according to the third example. Parts (a), (b) of FIG. 35 respectively show lens layout diagrams of lens system IL3, similarly to the parts (a), (b) of FIG. 3.

Lens system IL3 of the third example includes first to ninth lens elements L1 to L9, which are sequentially arranged similarly to the first example, and diaphragm A located between fourth and fifth lens elements L4, L5.

In lens system IL3 of the present example, the free-curved surface lens in the front group is second lens element L2, and the free-curved surface lenses in the rear group are eighth and ninth lens elements L8, L9. Third lens element L3 of the present example is a rotationally symmetric aspherical lens having an aspherical surface on the object side. First and seventh lens elements L1, L7 are rotationally symmetric aspherical lenses having an aspherical surface on the image surface side. A numerical example corresponding to lens system IL3 of the third example is shown in FIGS. 36 to 46.

FIG. 36 is a table showing surface data of lens system IL3 in the numerical example 3. FIG. 37 is a table showing various data of lens system IL3 in the present example. FIGS. 36, 37 show respective data, similarly to FIGS. 5, 6 of the numerical example 1, respectively.

FIG. 38 is a table showing aspherical surface data of second surface s2 in lens system IL3 of the present example. The aspherical surface data in FIG. 38 indicates, for a surface on the image surface side of first lens element L1, the coefficients of the mathematical expression (E1), similarly to the numerical example 1.

FIGS. 39, 40 are tables showing free-curved surface data of third and fourth surfaces s3, s4 in lens system IL3 of the present example, respectively. The free-curved surface data in FIGS. 39, 40 show, for both surfaces of second lens element L2, the coefficients of the mathematical expression (E2), similarly to the numerical example 1.

FIGS. 41, 42 are tables showing aspherical surface data of fifth and 14th surfaces s5, s14 in lens system IL3, respectively. FIG. 41 shows aspherical surface data of a surface on the object side of third lens element L3, similarly to FIG. 38. FIG. 42 similarly shows aspherical surface data of a surface on the image surface side of seventh lens element L7.

FIGS. 43 to 46 are tables showing free-curved surface data of 15th to 18th surfaces s15 to s18 in lens system IL3, respectively. FIGS. 43 to 46 show the respective free-curved surface data of both surfaces of eighth and ninth lens elements L8, L9, similarly to FIG. 39 and the like.

Figure 47:
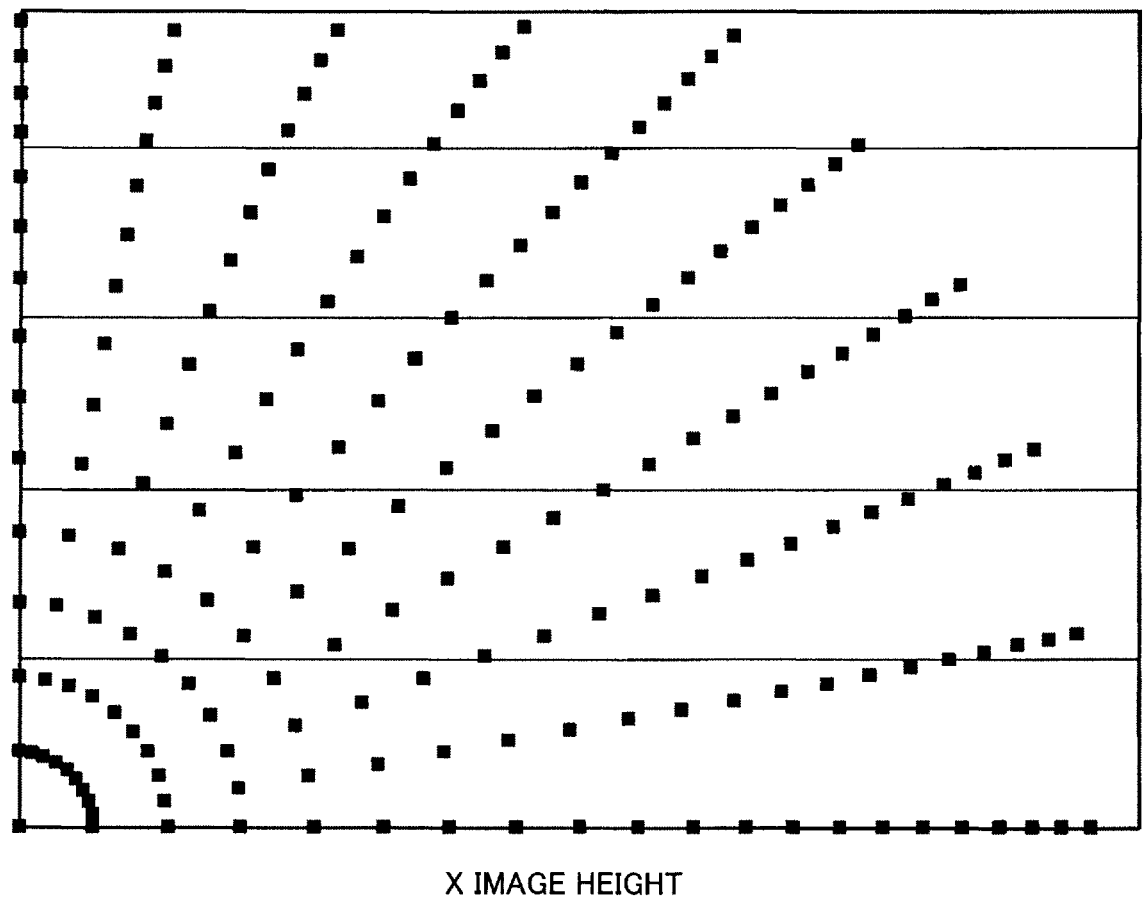
FIG. 47 is a scatter plot showing a relationship between an angle of view and an image point in the lens system of the numerical example 3.
Figure 48:
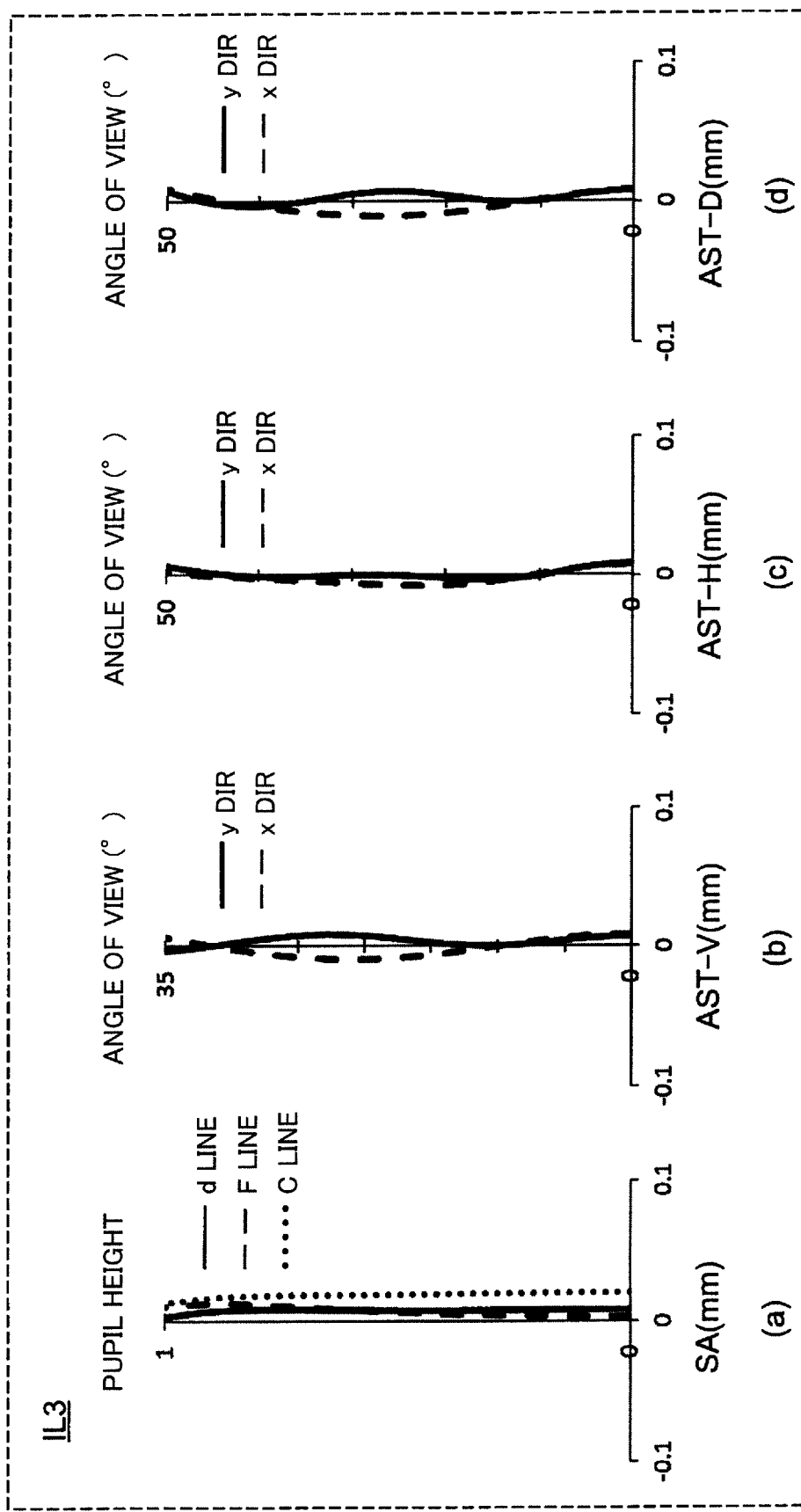
FIG. 48 is an aberration diagram showing various aberrations of the lens system of the numerical example 3.

Based on the above numerical example 3, FIG. 47 shows a relationship between an angle of view and image point P3 in lens system IL3 of the present example. FIG. 48 shows various aberrations of lens system IL3 in the present example. Parts (a), (b), (c), (d) of FIG. 48 respectively show aberration diagrams of lens system IL3 in the present example, similarly to the parts (a) to (d) of FIG. 17. As shown in FIG. 18, lens system IL3 of the present example satisfies respective conditions (1) to (6) described above. As described above, lens system IL3 of the present example can also obtain negative distortion in the Y-direction rather than in the X-direction, similarly to the first example.

Other Embodiments

The first embodiment has been described above as an example of the technique disclosed in the present application. However, the technology in the present disclosure is not limited thereto, and can also be applied to embodiments in which modifications, replacements, additions, omissions, and the like, are appropriately made. Also, a new embodiment can be made by combining each constituent elements described in each of the above-described embodiments. Other embodiments will be described as examples below.

In the first embodiment described above, a rectangular imaging surface has been illustrated in FIG. 2, but the imaging surface of imaging element 12 is not limited thereto. In the present embodiment, the imaging surface of imaging element 12 may have various quadrilateral shapes other than a rectangular shape, or may be partially masked. Further, the imaging surface of imaging element 12 may be curved. In the case of such imaging element 12, the same effects as those of the first embodiment can also be obtained by lens system IL of the present embodiment.

For example, long side Dx and short side Dy of imaging element 12 of the present embodiment do not need to be orthogonal to each other, and may cross at various angles. Further, imaging element 12 may have two sides having the same length instead of long side Dx and short side Dy. In imaging optical system IL of the present embodiment, the first and second directions defined by major axis Ix and minor axis Iy of image circle Is also do not need to be orthogonal to each other, and may cross at various angles. The lengths of the axes of image circle Is in the first and second directions may be the same. Image circle Is may not necessarily be distorted from a circle.

In each of the above embodiments, the XY polynomial surface has been illustrated as an example of the free-curved surface. In the present embodiment, the free-curved surface is not limited to the above surface, and may be an anamorphic aspherical surface or a toric surface, for example. In the lens system of the present embodiment, the free-curved surface lens satisfying condition (1) or the like may have a free-curved surface that is not anamorphic. The non-anamorphic free-curved surfaces include the XY polynomial surface but do not include an anamorphic aspherical surface. The non-anamorphic free-curved surface may not have a symmetric surface, for example.

Imaging system 10 of the present embodiment can be applied to various uses, e.g. in-vehicle use. For example, imaging device 11 may constitute an in-vehicle camera so as to capture an image of a scene in front of a moving body such as a vehicle. For example, for an image in which the scene in front of the vehicle is to be captured, providing negative distortion in the vertical direction rather than in the horizontal direction can facilitate to detect signals, signs and the like, which are above the vehicle, as well as a vehicle in front of the vehicle. Without being limited to the front of the moving body, imaging device 11 as an in-vehicle camera may be applied to use for capturing images of various scenes behind or on the side of the moving body. Without being limited to the in-vehicle use, imaging system 10 can also be applied to a surveillance camera that monitors various situations, for example.

The embodiments have been described above as examples of the technology in the present disclosure. For this purpose, the accompanying drawings and detailed description have been provided.

Therefore, the constituent elements described in the accompanying drawings and detailed description can include: not only constituent elements essential for solving the problems; but also those not essential for solving the problems, in order to describe the technology as examples. Therefore, those non-essential constituent elements should not be immediately recognized as being essential as they are described in the accompanying drawings and detailed description.

Additionally, the embodiments described above are intended to illustrate the technique in the present disclosure, and hence various changes, substitutions, additions, omissions and the like can be made within the scope of the claims and the scope of equivalents thereof.

Summary of Aspects

Hereinafter, various aspects according to the present disclosure will be described as examples.

A first aspect according to the present disclosure is a lens system for forming an image of light incident from an object side on an imaging element arranged on an image surface side. The lens system includes a plurality of lens elements including a free-curved surface lens, and a diaphragm arranged between the plurality of lens elements. The free-curved surface lens has a free-curved surface that is asymmetrical with respect to a first direction and a second direction crossing with each other. In the plurality of lens elements, the free-curved surface lens satisfying following conditional expression (1) is arranged on the image surface side of the diaphragm.

$$D \times (SV-SH)/IH > 0.08 \quad (1)$$

where,

IH: a height, in the first direction, at which a ray having an angle of view of 30° forms an image on the image surface;

SH: a sag amount, in the first direction, at height IH of the free-curved surface;

SV: a sag amount, in the second direction, at height IH of the free-curved surface; and D: "1" when the free-curved surface is on the object side of the free-curved surface lens, and "−1" when the free-curved surface is on the image surface side of the free-curved surface lens.

According to the above lens system, power of the free-curved surface lens in the second direction can be increased more positively than in the first direction by conditional expression (1). Thereby, negative distortion can be generated in the second direction rather than in the first direction.

A second aspect is the lens system of the first aspect, and the plurality of lens elements include a free-curved surface lens satisfying following conditional expression (2).

$$D \times (SVb-SHb)/IHb < -0.01 \quad (2)$$

where,

IHb: a height, in the first direction, at which a ray having an angle of view of 15° forms an image on the image surface;

SHb: a sag amount, in the first direction, at height IHb of the free-curved surface;

SVb: a sag amount, in the second direction, at height IHb of the free-curved surface; and D: "1" when the free-curved surface is on the object side of the free-curved surface lens, and "−1" when the free curved surface is on the image surface side of the free curved surface lens.

According to the above lens system, the power of the free-curved surface lens in the second direction can be increased more negatively than in the first direction by conditional expression (2), so that an adverse reaction of conditional expression (1) can be suppressed.

A third aspect is the lens system of the first aspect, and satisfies following conditional expression (3).

$$OAL/SD < 7.5 \quad (3)$$

where,

OAL: an optical total length of the lens system; and

SD: a diameter of the diaphragm. Thereby, the lens system can be reduced in size while ensuring its brightness.

A fourth aspect is the lens system of the first aspect, and the lens element closest to the object side in the plurality of lens elements satisfies following conditional expression (4).

$$nd1>1.6 \tag{4}$$

where, nd1: a refractive index of the lens element with respect to a d-line. With this, ensuring an angle of view or the like can be easily achieved by setting the refractive index of the first lens element such that a ray from the outside is greatly bent.

A fifth aspect is the lens system of the first aspect, and the free-curved surface lens satisfies following conditional expression (5).

$$ndf>1.5 \tag{5}$$

where, ndf: a refractive index of the free-curved surface lens with respect to the d-line. With this, a ray can be freely and easily controlled by using the free-curved surface lens having a higher refractive index in the lens system.

A sixth aspect is the lens system of the first aspect, and the free-curved surface lens satisfies following conditional expression (6).

$$20<vf<60 \tag{6}$$

where, vf: an Abbe's number of the free-curved surface lens. According to this, by properly setting the Abbe's number for the lens element having the free-curved surface, it can facilitate to ensure an image forming performance of the lens system with respect to a temperature change.

A seventh aspect is an imaging device including the lens system according to any one of the first to sixth aspects and an imaging element. The imaging element captures an image formed by the imaging optical system. The imaging element has a first side that corresponds to the first direction and a second side that corresponds to the second direction and has a length less than or equal to the first side. In the imaging device, negative distortion relatively different between the first and second directions can be generated by the lens system.

An eighth aspect is an imaging system including the imaging device according to the seventh aspect and an image processor. The image processor performs image processing on the image captured by the imaging element of the imaging device. In the imaging system, the lens system of the imaging device can generate negative distortion relatively different between the first and second directions.

INDUSTRIAL APPLICABILITY

The imaging system according to the present disclosure can be applied to various uses for capturing images, and can be applied to e.g. an in-vehicle camera, a surveillance camera, a web camera, a digital camera or the like. The lens system according to the present disclosure may be provided to interchangeable lens devices.

The invention claimed is:

1. A lens system for forming an image of light incident from an object side on an imaging element arranged on an image surface side, the lens system comprising: a plurality of lens elements including free-curved surface lenses; and a diaphragm arranged between the plurality of lens elements, wherein the plurality of lens elements form a front group arranged on the object side of the diaphragm, and a rear group arranged on the image surface side of the diaphragm, wherein a first lens element has an aspherical surface that is rotationally symmetrical, the first lens element being closest to the object side in the plurality of lens elements, wherein the free-curved surface lenses each has a free-curved surface that is asymmetrical with respect to a first direction and a second direction, and are arranged in the front group and the rear group respectively, the first and second directions crossing with each other, wherein a free-curved surface lens satisfying following conditional expression (i) is arranged on the rear group in the plurality of lens elements, $$D\times(SV-SH)/IH>0.08 \tag{1}$$

where, IH: a height at which a ray with an angle of view of 300 forms an image on the image surface, in the first direction; SH: a sag amount at the height IH of the free-curved surface, in the first direction; SV: a sag amount at the height IH of the free-curved surface, in the second direction; and D: "1" in a case where the free-curved surface is on the object side of the free-curved surface lens, or "−1" in a case where the free-curved surface is on the image surface side of the free-curved surface lens.

2. The lens system according to claim 1, wherein the plurality of lens elements include a free-curved surface lens satisfying following conditional expression (2), $$D\times(SVb-SHb)/IHb>-0.01 \tag{2}$$

where, IHb: a height at which a ray with an angle of view of 15° forms an image on the image surface, in the first direction; SHb: a sag amount at the height IHb of the free-curved surface, in the first direction; SVb: a sag amount at the height IHb of the free-curved surface, in the second direction.

3. The lens system according to claim 1, satisfying following conditional expression (3), $$OAL/SD<7.5 \tag{3}$$

where,

OAL: an optical total length of the lens system; and
SD: a diameter of the diaphragm.

4. The lens system according to claim 1, wherein the first lens element satisfies following conditional expression (4), $$nd1>1.6 \tag{4}$$

where, nd1: a refractive index of the lens element with respect to a d-line.

5. The lens system according to claim 1, wherein the free-curved surface lens satisfies following conditional expression (5), $$ndf>1.5 \tag{5}$$

where, ndf: a refractive index of the free-curved surface lens with respect to the d-line.

6. The lens system according to claim 1, wherein the free-curved surface lens satisfies following conditional expression (6), $$20<vf<60 \tag{6}$$

where, vf: an Abbe's number of the free-curved surface lens.

7. The lens system according to claim 1, wherein the front group includes two or more free-curved surface lenses, and the rear group includes two or more free-curved surface lenses.

8. The lens system according to claim 7, wherein
the two or more free-curved surface lenses in the rear group are arranged at closest to the image surface side, and
the two or more free-curved surface lenses in the front group are arranged next to the first lens element from the object side.

9. The lens system according to claim 1, wherein a free-curved surface lens in the front group has a negative power.

10. The lens system according to claim 1, wherein the plurality of the lens element includes a free-curved surface lens having free-curved surfaces on both of the object side and the image surface side.

11. The lens system according to claim 1, wherein the free-curved surface lens satisfying the conditional expression (1) has a free-curved surface which is not anamorphic.

12. An imaging device, comprising: the lens system according to claim 1, and the imaging element to capture an image formed by an imaging optical system.

13. An imaging system, comprising:
the imaging device according to claim 12, and
an image processor to perform image processing on the image captured by the imaging element of the imaging device.

* * * * *